US012602020B2

(12) United States Patent
Baker et al.

(10) Patent No.: US 12,602,020 B2
(45) Date of Patent: Apr. 14, 2026

(54) LOAD CONTROL SYSTEM RESPONSIVE TO LOCATION OF AN OCCUPANT AND MOBILE DEVICES

(71) Applicant: Lutron Technology Company LLC, Coopersburg, PA (US)

(72) Inventors: Rhodes B. Baker, Bethlehem, PA (US); John H. Bull, Coplay, PA (US); William Bryce Fricke, Bethlehem, PA (US); Jason C. Killo, Emmas, PA (US); Galen Edgar Knode, Macungie, PA (US); Sanjeev Kumar, Harleysville, PA (US); Sean R. Pearson, Allentown, PA (US); James Mathias Weber, Allentown, PA (US); Daniel L. Twaddell, Allentown, PA (US); Daniel Curtis Raneri, Orefield, PA (US); Timothy Mann, Quakertown, PA (US); Sriram Gopalakrishnan, Bethlehem, PA (US); Jeffrey Karc, Danielsville, PA (US); Greg Edward Sloan, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 29 days.

(21) Appl. No.: 17/236,813

(22) Filed: Apr. 21, 2021

(65) Prior Publication Data

US 2021/0240149 A1     Aug. 5, 2021

Related U.S. Application Data

(63) Continuation of application No. 14/832,798, filed on Aug. 21, 2015, now abandoned.

(Continued)

(51) Int. Cl.
*G05B 15/02*        (2006.01)
*H02J 3/14*         (2006.01)
(Continued)

(52) U.S. Cl.
CPC ................ *G05B 15/02* (2013.01); *H02J 3/14* (2013.01); *H02J 13/00004* (2020.01);
(Continued)

(58) Field of Classification Search
CPC ......... H02J 3/14; H02J 13/0075; H04W 4/02; H05B 37/0227; H05B 37/0272; G05B 15/02
See application file for complete search history.

(56) References Cited

U.S. PATENT DOCUMENTS

| | | | |
|---|---|---|---|
| 5,248,919 A | 9/1993 | Hanna et al. | |
| 5,905,442 A | 5/1999 | Mosebrook et al. | |

(Continued)

FOREIGN PATENT DOCUMENTS

| | | |
|---|---|---|
| CN | 102293058 | 12/2011 |
| CN | 102833910 | 12/2012 |

(Continued)

OTHER PUBLICATIONS

Anagnostopoulos, et al., "Predicting the Location of Mobile Users: A Machine Learning Approach", ICPS '09: Proceedings of the 2009 International Conference on Pervasive Services, Jul. 2009, pp. 65-72.

(Continued)

*Primary Examiner* — Robert E Fennema
*Assistant Examiner* — Olvin Lopez Alvarez
(74) *Attorney, Agent, or Firm* — Michael S. Czarnecki; Glen R. Farbanish; Philip N. Smith

(57) ABSTRACT

A load control system may control an electrical load in a space of a building occupied by an occupant. The load (Continued)

control system may include a controller configured to determine the location of the occupant, and a load control device configured to automatically control the electrical load in response to the location of the occupant. The load control system may also include a mobile device adapted to be located on or immediately adjacent the occupant and configured to transmit and receive wireless signals. The load control device may be configured to automatically control the electrical load when the mobile device is located in the space. The load control system may further comprise an occupancy sensor and the load control device may automatically control the electrical load when the occupancy sensor indicates that the space is occupied and the mobile device is located in the space.

18 Claims, 9 Drawing Sheets

Related U.S. Application Data

(60) Provisional application No. 62/201,504, filed on Aug. 5, 2015, provisional application No. 62/094,213, filed on Dec. 19, 2014, provisional application No. 62/040,828, filed on Aug. 22, 2014.

(51) Int. Cl.
| | |
|---|---|
| *H02J 13/00* | (2006.01) |
| *H04W 4/029* | (2018.01) |
| *H05B 47/115* | (2020.01) |
| *H05B 47/175* | (2020.01) |
| *H05B 47/19* | (2020.01) |
| *H05B 47/125* | (2020.01) |

(52) U.S. Cl.
CPC .. *H02J 13/00024* (2020.01); *H02J 13/00026* (2020.01); *H04W 4/029* (2018.02); *H05B 47/115* (2020.01); *H05B 47/19* (2020.01); *H05B 47/1965* (2024.01); *G05B 2219/2642* (2013.01); *H02J 2310/14* (2020.01); *H05B 47/125* (2020.01); *Y02B 70/30* (2013.01); *Y02B 70/3225* (2013.01); *Y02B 90/20* (2013.01); *Y04S 20/20* (2013.01); *Y04S 20/222* (2013.01); *Y04S 20/246* (2013.01); *Y04S 40/126* (2013.01)

(56) References Cited

U.S. PATENT DOCUMENTS

| | | | |
|---|---|---|---|
| 5,982,103 | A | 11/1999 | Mosebrook et al. |
| 6,167,464 | A | 12/2000 | Kretschmann |
| 6,803,728 | B2 | 10/2004 | Balasubramaniam et al. |
| 7,038,584 | B2 | 5/2006 | Carter |
| 7,339,523 | B2 | 3/2008 | Bye |
| 7,358,854 | B2 | 4/2008 | Egner et al. |
| 7,391,297 | B2 | 6/2008 | Cash et al. |
| 7,755,505 | B2 | 7/2010 | Johnson et al. |
| 7,764,162 | B2 | 7/2010 | Cash et al. |
| 7,880,639 | B2 | 2/2011 | Courtney et al. |
| 7,889,051 | B1 | 2/2011 | Billig et al. |
| 7,925,384 | B2 | 4/2011 | Huizenga et al. |
| 8,009,042 | B2 | 8/2011 | Steiner et al. |
| RE42,927 | E | 11/2011 | Want et al. |
| 8,099,195 | B2 | 1/2012 | Imes et al. |
| 8,108,076 | B2 | 1/2012 | Imes et al. |
| 8,159,156 | B2 | 4/2012 | Henig et al. |
| 8,174,381 | B2 | 5/2012 | Imes et al. |
| 8,199,010 | B2 | 6/2012 | Sloan et al. |
| 8,228,184 | B2 | 7/2012 | Blakeley et al. |
| 8,326,793 | B1 | 12/2012 | Bowers et al. |
| 8,334,898 | B1 | 12/2012 | Ryan et al. |
| 8,334,901 | B1 | 12/2012 | Ganick et al. |
| 8,351,937 | B2 | 1/2013 | Lee |
| 8,373,362 | B2 | 2/2013 | Chemel et al. |
| 8,396,604 | B2 | 3/2013 | Imes et al. |
| 8,410,706 | B2 | 4/2013 | Steiner et al. |
| 8,412,382 | B2 | 4/2013 | Imes et al. |
| 8,416,290 | B2 | 4/2013 | Ryan et al. |
| 8,417,388 | B2 | 4/2013 | Altonen et al. |
| 8,422,401 | B1 | 4/2013 | Choong et al. |
| 8,428,782 | B2 | 4/2013 | Imes |
| 8,432,438 | B2 | 4/2013 | Ryan et al. |
| 8,436,896 | B2 | 5/2013 | Staats et al. |
| 8,451,116 | B2 | 5/2013 | Steiner et al. |
| 8,457,502 | B2 | 6/2013 | Ryan et al. |
| 8,457,793 | B2 | 6/2013 | Golding et al. |
| 8,457,797 | B2 | 6/2013 | Imes et al. |
| 8,473,109 | B1 | 6/2013 | Imes et al. |
| 8,498,749 | B2 | 7/2013 | Imes et al. |
| 8,504,174 | B2 | 8/2013 | Rahme et al. |
| 8,504,180 | B2 | 8/2013 | Imes et al. |
| 8,509,954 | B2 | 8/2013 | Imes et al. |
| 8,510,255 | B2 | 8/2013 | Fadell et al. |
| 8,570,221 | B2 | 10/2013 | Bao et al. |
| 8,571,518 | B2 | 10/2013 | Imes et al. |
| 8,577,392 | B1 * | 11/2013 | Pai .......................... H04L 67/52 |
| | | | 455/456.2 |
| 8,600,564 | B2 | 12/2013 | Imes et al. |
| 8,610,376 | B2 | 12/2013 | Chemel et al. |
| 8,610,377 | B2 | 12/2013 | Chemel et al. |
| 8,626,344 | B2 | 1/2014 | Imes et al. |
| 8,630,741 | B1 | 1/2014 | Matsuoka et al. |
| 8,659,230 | B2 | 2/2014 | Nanahara et al. |
| 8,710,772 | B2 | 4/2014 | Henig et al. |
| 8,725,178 | B2 | 5/2014 | Mohideen et al. |
| 8,729,835 | B2 | 5/2014 | Henig et al. |
| 8,749,146 | B2 | 6/2014 | Jones |
| 8,755,039 | B2 | 6/2014 | Ramer et al. |
| 8,760,262 | B2 | 6/2014 | Veskovic |
| 8,779,905 | B2 | 7/2014 | Courtney et al. |
| 8,787,332 | B2 * | 7/2014 | Ha .......................... H04L 67/12 |
| | | | 370/328 |
| 8,788,448 | B2 | 7/2014 | Fadell et al. |
| 8,796,958 | B2 | 8/2014 | Billig et al. |
| 8,812,419 | B1 | 8/2014 | Teller et al. |
| 8,823,277 | B2 | 9/2014 | Chemel et al. |
| 8,829,821 | B2 | 9/2014 | Chobot et al. |
| 8,832,003 | B1 | 9/2014 | Bowers et al. |
| 8,855,830 | B2 | 10/2014 | Imes et al. |
| 8,909,380 | B2 | 12/2014 | Golding et al. |
| 8,912,735 | B2 | 12/2014 | Chobot et al. |
| 8,912,905 | B2 | 12/2014 | Wong et al. |
| 8,928,232 | B2 | 1/2015 | Aggarwal et al. |
| 8,954,170 | B2 | 2/2015 | Chemel et al. |
| 8,994,295 | B2 | 3/2015 | Mohan et al. |
| 9,001,317 | B2 | 4/2015 | Ramer et al. |
| 9,035,769 | B2 | 5/2015 | Steiner et al. |
| 9,053,456 | B2 | 6/2015 | Verthein et al. |
| 9,060,392 | B2 | 6/2015 | Aggarwal et al. |
| 9,071,453 | B2 | 6/2015 | Shoemaker et al. |
| 9,072,133 | B2 | 6/2015 | Chemel et al. |
| 9,107,152 | B1 | 8/2015 | Wurster |
| 9,148,937 | B2 | 9/2015 | Steiner et al. |
| 9,164,524 | B2 | 10/2015 | Imes et al. |
| 9,204,291 | B2 | 12/2015 | Jackson et al. |
| 9,232,610 | B2 | 1/2016 | Gritti |
| 9,237,620 | B1 | 1/2016 | Knapp et al. |
| 9,345,115 | B2 | 5/2016 | Mohan |
| 9,374,874 | B1 | 6/2016 | Ewing |
| 9,386,668 | B2 | 7/2016 | Knapp et al. |
| 9,392,657 | B2 | 7/2016 | Lee et al. |
| 9,437,086 | B2 | 9/2016 | Loveland et al. |
| 9,441,979 | B2 | 9/2016 | Barnard et al. |
| 9,480,131 | B1 | 10/2016 | Thorn |
| 9,520,250 | B2 | 12/2016 | O'Keeffe |
| 9,521,722 | B2 | 12/2016 | Wong et al. |
| 9,578,724 | B1 | 2/2017 | Knapp et al. |
| 9,602,172 | B2 | 3/2017 | Jackson et al. |
| 9,651,632 | B1 | 5/2017 | Knapp et al. |

(56)                References Cited

U.S. PATENT DOCUMENTS

| | | | |
|---|---|---|---|
| 9,746,333 B2 | 8/2017 | Barnard et al. | |
| 9,807,857 B2 | 10/2017 | Huang | |
| 9,820,359 B2 * | 11/2017 | Engelen | H05B 47/19 |
| 9,848,481 B2 | 12/2017 | Ando | |
| 10,088,818 B1 | 10/2018 | Mathews et al. | |
| 10,135,629 B2 | 11/2018 | Browne, Jr. et al. | |
| 10,599,174 B2 | 3/2020 | Baker et al. | |
| 10,917,259 B1 * | 2/2021 | Chein | H04L 12/282 |
| 11,204,616 B2 | 12/2021 | Baker et al. | |
| 2001/0041982 A1 | 11/2001 | Kawasaki et al. | |
| 2003/0013459 A1 | 1/2003 | Rankin et al. | |
| 2007/0140530 A1 | 6/2007 | Coogan et al. | |
| 2007/0194987 A1 | 8/2007 | Fedora | |
| 2008/0092075 A1 | 4/2008 | Jacob et al. | |
| 2008/0157957 A1 | 7/2008 | Pitchers et al. | |
| 2008/0183307 A1 | 7/2008 | Clayton et al. | |
| 2008/0197782 A1 | 8/2008 | Frumau | |
| 2008/0315772 A1 | 12/2008 | Knibbe | |
| 2009/0206983 A1 | 8/2009 | Knode et al. | |
| 2009/0300174 A1 | 12/2009 | Floris et al. | |
| 2010/0082136 A1 * | 4/2010 | Rosenblatt | B01D 53/9477 |
| | | | 340/3.1 |
| 2010/0181938 A1 | 7/2010 | Boleko Ribas et al. | |
| 2010/0188009 A1 | 7/2010 | Bull | |
| 2010/0201267 A1 | 8/2010 | Bourquin et al. | |
| 2010/0245588 A1 | 9/2010 | Waehner et al. | |
| 2010/0289643 A1 | 11/2010 | Trundle et al. | |
| 2011/0029370 A1 | 2/2011 | Roeding et al. | |
| 2011/0211110 A1 | 9/2011 | Doublet | |
| 2011/0213588 A1 | 9/2011 | Lin et al. | |
| 2011/0257466 A1 * | 10/2011 | Pintert | A61B 5/486 |
| | | | 600/27 |
| 2011/0316451 A1 | 12/2011 | Loveland et al. | |
| 2012/0001567 A1 | 1/2012 | Knapp et al. | |
| 2012/0092204 A1 | 4/2012 | Talstra et al. | |
| 2012/0143383 A1 * | 6/2012 | Cooperrider | H05B 47/175 |
| | | | 700/295 |
| 2012/0163206 A1 | 6/2012 | Leung et al. | |
| 2012/0169249 A1 | 7/2012 | Loveland et al. | |
| 2012/0242231 A1 | 9/2012 | Yianni et al. | |
| 2012/0319597 A1 | 12/2012 | Park et al. | |
| 2013/0006425 A1 | 1/2013 | Bell et al. | |
| 2013/0010018 A1 | 1/2013 | Economy | |
| 2013/0014219 A1 * | 1/2013 | Kraus | H04L 12/2834 |
| | | | 726/3 |
| 2013/0026947 A1 | 1/2013 | Economy et al. | |
| 2013/0030589 A1 | 1/2013 | Pessina et al. | |
| 2013/0058660 A1 | 3/2013 | Bae et al. | |
| 2013/0085609 A1 | 4/2013 | Barker | |
| 2013/0109404 A1 | 5/2013 | Husney | |
| 2013/0109406 A1 | 5/2013 | Meador et al. | |
| 2013/0141223 A1 | 6/2013 | Brandsma et al. | |
| 2013/0145610 A1 | 6/2013 | Feri et al. | |
| 2013/0170378 A1 | 7/2013 | Ray et al. | |
| 2013/0181834 A1 | 7/2013 | Bentley et al. | |
| 2013/0214609 A1 | 8/2013 | Carmen, Jr. et al. | |
| 2013/0222122 A1 | 8/2013 | Killo et al. | |
| 2013/0245837 A1 | 9/2013 | Grohman | |
| 2013/0278422 A1 * | 10/2013 | Friedman | G08B 25/008 |
| | | | 340/541 |
| 2013/0285472 A1 | 10/2013 | Bull | |
| 2013/0303193 A1 | 11/2013 | Dharwada et al. | |
| 2013/0314560 A1 | 11/2013 | Gritti et al. | |
| 2013/0331087 A1 | 12/2013 | Shoemaker et al. | |
| 2014/0001846 A1 | 1/2014 | Mosebrook et al. | |
| 2014/0001977 A1 | 1/2014 | Zacharchuk et al. | |
| 2014/0009068 A1 | 1/2014 | Ivey et al. | |
| 2014/0031987 A1 | 1/2014 | Ericsson et al. | |
| 2014/0042915 A1 | 2/2014 | Ono et al. | |
| 2014/0045549 A1 | 2/2014 | Ryan et al. | |
| 2014/0052783 A1 | 2/2014 | Swatsky et al. | |
| 2014/0062309 A1 | 3/2014 | Kim | |
| 2014/0066098 A1 | 3/2014 | Stern et al. | |
| 2014/0070919 A1 | 3/2014 | Jackson et al. | |
| 2014/0086590 A1 | 3/2014 | Ganick et al. | |
| 2014/0103819 A1 | 4/2014 | Mohan | |
| 2014/0106735 A1 * | 4/2014 | Jackson | H05B 47/1965 |
| | | | 455/419 |
| 2014/0108084 A1 | 4/2014 | Bargetzi et al. | |
| 2014/0122017 A1 | 5/2014 | Chu | |
| 2014/0129006 A1 | 5/2014 | Chen et al. | |
| 2014/0132475 A1 | 5/2014 | Bhutani et al. | |
| 2014/0153923 A1 | 6/2014 | Casaccia | |
| 2014/0159589 A1 | 6/2014 | Pandharipande et al. | |
| 2014/0175875 A1 | 6/2014 | Newman, Jr. et al. | |
| 2014/0175990 A1 | 6/2014 | Bhatkar et al. | |
| 2014/0176310 A1 | 6/2014 | Kotlicki | |
| 2014/0177469 A1 | 6/2014 | Neyhart | |
| 2014/0180487 A1 | 6/2014 | Bull | |
| 2014/0191848 A1 | 7/2014 | Imes et al. | |
| 2014/0222213 A1 | 8/2014 | Mohan et al. | |
| 2014/0232298 A1 | 8/2014 | Gillies et al. | |
| 2014/0235265 A1 | 8/2014 | Slupik | |
| 2014/0235269 A1 | 8/2014 | Ericsson et al. | |
| 2014/0239816 A1 | 8/2014 | Lee | |
| 2014/0239852 A1 | 8/2014 | Kim et al. | |
| 2014/0246991 A1 | 9/2014 | Kim | |
| 2014/0247117 A1 | 9/2014 | Veskovic | |
| 2014/0250200 A1 | 9/2014 | Geurts et al. | |
| 2014/0265568 A1 | 9/2014 | Crafts et al. | |
| 2014/0265870 A1 | 9/2014 | Walma et al. | |
| 2014/0267008 A1 | 9/2014 | Jain et al. | |
| 2014/0269222 A1 | 9/2014 | Patton et al. | |
| 2014/0274114 A1 | 9/2014 | Rowitch | |
| 2014/0277763 A1 | 9/2014 | Ramachandran et al. | |
| 2014/0277805 A1 | 9/2014 | Browne, Jr. et al. | |
| 2014/0285090 A1 | 9/2014 | Chemel et al. | |
| 2014/0285113 A1 | 9/2014 | Huang | |
| 2014/0293605 A1 | 10/2014 | Chemel et al. | |
| 2014/0312777 A1 | 10/2014 | Shearer et al. | |
| 2014/0333206 A1 | 11/2014 | Simons et al. | |
| 2014/0337080 A1 | 11/2014 | Jackson | |
| 2014/0376530 A1 * | 12/2014 | Erickson | H04L 45/745 |
| | | | 370/338 |
| 2015/0008828 A1 | 1/2015 | Carrigan et al. | |
| 2015/0008845 A1 | 1/2015 | Kim et al. | |
| 2015/0015377 A1 | 1/2015 | Bull et al. | |
| 2015/0038165 A1 | 2/2015 | Tuo et al. | |
| 2015/0038171 A1 | 2/2015 | Uilecan et al. | |
| 2015/0046385 A1 | 2/2015 | Shimizu et al. | |
| 2015/0048758 A1 | 2/2015 | Carrigan et al. | |
| 2015/0048924 A1 | 2/2015 | Feldstein et al. | |
| 2015/0054620 A1 | 2/2015 | Graube et al. | |
| 2015/0061511 A1 | 3/2015 | Chemel et al. | |
| 2015/0076993 A1 | 3/2015 | Mohan | |
| 2015/0081474 A1 | 3/2015 | Kostka et al. | |
| 2015/0137699 A1 | 5/2015 | Killo et al. | |
| 2015/0142141 A1 * | 5/2015 | Okabayashi | G05B 15/02 |
| | | | 700/83 |
| 2015/0147067 A1 | 5/2015 | Ryan et al. | |
| 2015/0148964 A1 | 5/2015 | Schultz et al. | |
| 2015/0179058 A1 | 6/2015 | Crafts et al. | |
| 2015/0185752 A1 | 7/2015 | Bard et al. | |
| 2015/0189068 A1 | 7/2015 | Mohan et al. | |
| 2015/0189723 A1 | 7/2015 | Ogawa | |
| 2015/0189724 A1 | 7/2015 | Karc et al. | |
| 2015/0195099 A1 | 7/2015 | Imes et al. | |
| 2015/0204561 A1 | 7/2015 | Sadwick et al. | |
| 2015/0223309 A1 | 8/2015 | Mohan et al. | |
| 2015/0223310 A1 | 8/2015 | Steiner et al. | |
| 2015/0230323 A1 | 8/2015 | Steiner et al. | |
| 2015/0241860 A1 | 8/2015 | Raid | |
| 2015/0279051 A1 | 10/2015 | Kovesi et al. | |
| 2015/0296594 A1 | 10/2015 | Blum et al. | |
| 2015/0301543 A1 | 10/2015 | Janoso et al. | |
| 2015/0330805 A1 * | 11/2015 | Cho | H04W 4/02 |
| | | | 701/428 |
| 2015/0339096 A1 | 11/2015 | Lakshminarayanan | |
| 2015/0342010 A1 | 11/2015 | Romano | |
| 2015/0346701 A1 * | 12/2015 | Gordon | G05B 15/02 |
| | | | 700/275 |
| 2015/0365787 A1 | 12/2015 | Farrell | |
| 2015/0366035 A1 | 12/2015 | Baek et al. | |

(56)  References Cited

U.S. PATENT DOCUMENTS

| | | | |
|---|---|---|---|
| 2015/0373482 | A1 | 12/2015 | Barnard et al. |
| 2016/0027029 | A1 * | 1/2016 | Poole .................. G06Q 10/087 |
| | | | 705/7.34 |
| 2016/0054130 | A1 * | 2/2016 | Marimuthu .......... G01C 21/206 |
| | | | 701/408 |
| 2016/0056629 | A1 | 2/2016 | Baker et al. |
| 2016/0077532 | A1 | 3/2016 | Lagerstedt et al. |
| 2016/0128158 | A1 | 5/2016 | Harder |
| 2016/0205748 | A1 | 7/2016 | Lashina |
| 2016/0286631 | A1 | 9/2016 | Wan et al. |
| 2016/0338170 | A1 | 11/2016 | Lebel et al. |
| 2016/0345414 | A1 * | 11/2016 | Nolan .................. H05B 47/196 |
| 2017/0038787 | A1 | 2/2017 | Baker et al. |
| 2017/0099720 | A1 | 4/2017 | Ogawa |
| 2018/0027386 | A1 | 1/2018 | Zampini, II |
| 2018/0177031 | A1 | 6/2018 | Yoo et al. |
| 2018/0198526 | A1 | 7/2018 | Mueller et al. |
| 2018/0219869 | A1 | 8/2018 | Kumar |
| 2018/0242434 | A1 | 8/2018 | Wang et al. |
| 2018/0246481 | A1 * | 8/2018 | Henneberger ........... F24F 11/67 |
| 2020/0068688 | A1 * | 2/2020 | Knauss ................ H05B 47/185 |
| 2021/0357111 | A1 * | 11/2021 | Alfonzo .............. G06F 3/04883 |
| 2022/0022306 | A1 * | 1/2022 | Ho .......................... H05B 47/19 |

FOREIGN PATENT DOCUMENTS

| | | | | |
|---|---|---|---|---|
| CN | 103874290 | 6/2014 | | |
| CN | 104035403 | 9/2014 | | |
| CN | 104320883 | 1/2015 | | |
| CN | 104812143 | 7/2015 | | |
| DE | 102009052952 | 9/2010 | | |
| EP | 2410822 | 1/2012 | | |
| EP | 3195699 | 7/2017 | | |
| EP | 3332612 | 6/2018 | | |
| EP | 3376835 | 9/2018 | | |
| EP | 3376836 | 9/2018 | | |
| WO | WO 2004/049767 | 6/2004 | | |
| WO | WO 2004/057368 | 7/2004 | | |
| WO | WO-2006134799 A1 * | 12/2006 | ............. G06Q 10/00 | |
| WO | WO 2013/001432 | 1/2013 | | |
| WO | WO 2013/111134 | 8/2013 | | |
| WO | WO 2013/132393 | 9/2013 | | |
| WO | WO 2014/009291 | 1/2014 | | |
| WO | WO 2014/057460 | 4/2014 | | |
| WO | WO 2014/203170 | 12/2014 | | |
| WO | WO 2015/001444 | 1/2015 | | |
| WO | WO 2015/025235 | 2/2015 | | |
| WO | WO 2016/029165 | 2/2016 | | |
| WO | WO 2017024275 | 2/2017 | | |

OTHER PUBLICATIONS

Estel, et al., Feasibility of Bluetooth iBeacons for Indoor Localization, Digital Enterprise Computing, Lecture Notes in Informatics (LNI), 2015, 11 pages.

* cited by examiner

400

402 — Start

404 — Determine location of mobile device and/or occupant

406 — Retrieve occupant control parameters for mobile device and/or occupant

408 — Control electrical loads in the room according to occupant control parameters 410 — End

600

602 Start

604 Determine location of mobile device and/or occupant

606 Is the space occupied?

No

Yes

608 Retrieve occupant control parameters for mobile device and/or occupant

610 Automatically control electrical loads in the room according to occupant control parameters 612 End

LOAD CONTROL SYSTEM RESPONSIVE TO LOCATION OF AN OCCUPANT AND MOBILE DEVICES

CROSS-REFERENCE TO RELATED APPLICATIONS

This application is a continuation of U.S. application Ser. No. 14/832,798 filed Aug. 21, 2015 which claims the benefit of U.S. Provisional Application No. 62/201,504, filed Aug. 5, 2015, U.S. Provisional Application No. 62/094,213, filed Dec. 19, 2014, and U.S. Provisional Application No. 62/040, 828, filed Aug. 22, 2014, all of which are incorporated by reference as if fully set forth herein.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. An HVAC system may be used to control the temperature in the user environment. Each load control system may include various control devices, including control-source devices and control-target devices. The control-target devices may receive digital messages, which may include load control instructions, for controlling an electrical load from one or more of the control-source devices. The control-target devices may be capable of directly controlling an electrical load. The control-source devices may be capable of indirectly controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of control-source devices may include remote control devices, occupancy sensors, daylight sensors, temperature sensors, and/or the like.

Though current load control systems enable control of different electrical loads in a load control environment, the load control systems fail to use information that may be collected from one or more occupants and/or the occupant's mobile devices to control the electrical loads. Using such information may enable the load control systems to be more perceptive and to more conveniently control the electrical loads throughout the system.

SUMMARY

The present disclosure relates to a load control system for controlling the amount of power delivered to one or more electrical load, and more particularly, to a load control system able to control a plurality of electrical loads in response to the location of a control device and/or an occupant.

As described herein, a load control system for controlling an electrical load in a space of a building occupied by an occupant may comprise a system controller configured to determine the location of the occupant, and a load control device configured to control (e.g., automatically control) the electrical load in response to the location of the occupant. The load control system may further comprise a mobile device adapted to be located on or immediately adjacent the occupant and configured to transmit and receive wireless signals. The system controller may be configured to determine the location of the mobile device, for example, using a unique identifier of a beacon signal received by the mobile device. The system controller may transmit one or more location-based control elements associated with the determined location to the mobile device, and the mobile device may display the location-based control elements on a visual display. The system controller may be configured to receive a selected control element from the mobile device and may control the load control device to thus control the electrical load in response to the selected control element according to the determined location of the mobile device.

The load control device may comprise a lighting control device for controlling the intensity of a lighting load, for example, to a preset intensity that is dependent upon a unique identifier of the mobile device. The load control device and/or the controller may be configured to learn the preset intensity for the mobile device. The load control system may further comprise an occupancy sensor and the load control device may automatically control the electrical load when the occupancy sensor indicates that the space is occupied and the mobile device is located in the space. The load control device may be configured to automatically control the electrical load when the mobile device is located in the space.

A load control system for controlling an electrical load may comprise a load control device configured to control the electrical load, a mobile device configured to transmit and receive wireless signals, and a system controller configured to receive the wireless signals from the mobile device and to determine the location of the mobile device. The system controller may be configured to automatically transmit a command to the load control device for controlling the electrical load when the controller determines that the mobile device is in a space.

A load control system for controlling an electrical load may comprise a load control device configured to control the electrical load, and a mobile device configured to transmit a wireless signal including a command for controlling the electrical load. The mobile device may be configured to determine its location within the building and to adjust its operation in response to the location.

A mobile device for use in a control system having a plurality of control devices located at fixed locations around a building is also described herein. The mobile device may comprise a wireless communication circuit for receiving wireless signals from the plurality of control devices, and a controller responsive to the wireless communication circuit. The controller may be configured to measure signal strengths of the wireless signals received from the plurality of control devices and to store a set of measured signal strengths at a first location as a first signal strength signature. The controller may be configured to subsequently measure the signal strengths of the wireless signals received from the plurality of control devices and to determine that the mobile device is at the first location by comparing the measured signals strengths with the first signal strength signature.

Other features and advantages of the present disclosure will become apparent from the following detailed description that refers to the accompanying drawings.

DETAILED DESCRIPTION

Figure 1:
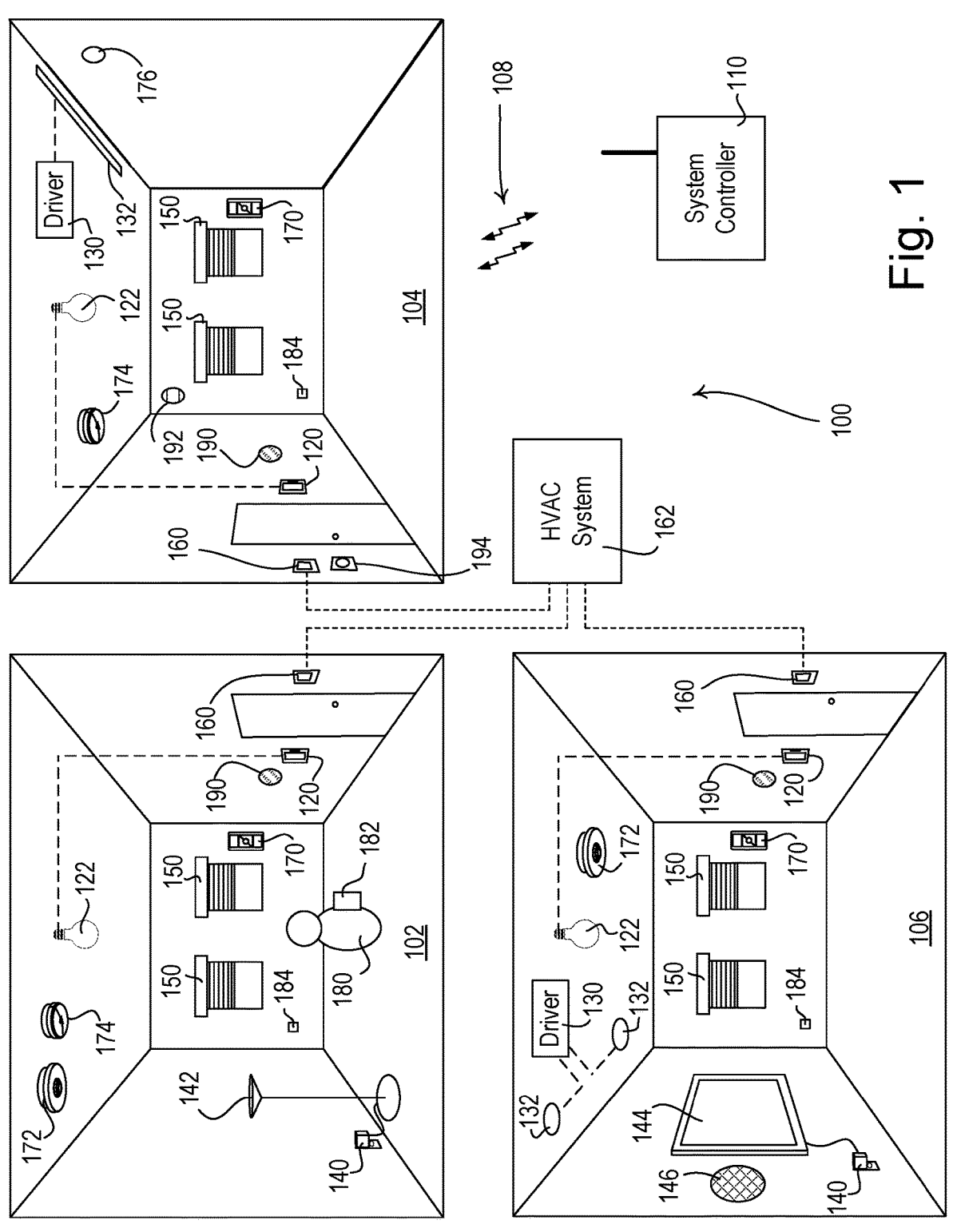
FIG. 1 is a diagram of an example load control system for controlling one or more electrical loads.

FIG. 1 is a simple diagram of an example load control system 100 for controlling the amount of power delivered from an alternating-current (AC) power source (not shown) to one or more electrical loads. The load control system 100 may be installed in a building having one or more rooms 102, 104, 106. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit digital messages in response to user inputs, occupancy/vacancy conditions, changes in measured light intensity, etc.) and a number of control-target devices (e.g., load control devices operable to receive digital messages and control respective electrical loads in response to the received digital messages). A single control device of the load control system 100 may operate as a control-source and/or a control-target device (e.g., as both a control-source device and a control-target device).

The control-source devices may be configured to transmit digital messages directly to the control-target devices. The load control system 100 may comprise a system controller 110 (e.g., a central controller or load controller) operable to communicate digital messages to and from the control devices (e.g., the control-source devices and/or the control-target devices). For example, the system controller 110 may be configured to receive digital messages from the control-source devices and transmit digital messages to the control-target devices in response to the digital messages received from the control-source devices. The digital messages transmitted to the control-target devices may include instructions generated for controlling a respective electrical load. The control-source and control-target devices and the system controller 110 may be configured to transmit and receive the RF signals 108 using a proprietary RF protocol, such as the ClearConnect® protocol. Alternatively, the RF signals 108 may be transmitted using a different RF protocol, such as, a standard protocol, for example, one of WIFI, ZIGBEE, Z-WAVE, KNX-RF, ENOCEAN RADIO protocols, or a different proprietary protocol.

The load control system 100 may comprise one or more load control devices, e.g., dimmer switches 120, for controlling respective lighting loads 122 located in one or more of the rooms 102, 104, 106. A dimmer switch 120 may be adapted to be wall-mounted in a standard electrical wallbox. The dimmer switch 120 may comprise a tabletop or plug-in load control device. The dimmer switch 120 may comprise a toggle actuator (e.g., a button) and an intensity adjustment actuator (e.g., a rocker switch). Actuations (e.g., successive actuations) of the toggle actuator may toggle, i.e., turn off and on, the respective lighting load 122. Actuations of an upper portion or a lower portion of the intensity adjustment actuator may respectively increase or decrease the amount of power delivered to the respective lighting load 122 and thus increase or decrease the intensity of the respective lighting load from a minimum intensity (e.g., approximately 1%) to a maximum intensity (e.g., approximately 100%). The dimmer switch 120 may comprise a plurality of visual indicators, e.g., light-emitting diodes (LEDs), which are arranged in a linear array and are illuminated to provide feedback of the intensity of the respective lighting load 122. Examples of wall-mounted dimmer switches are described in greater detail in U.S. Pat. No. 5,248,919, issued Sep. 29, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The dimmer switch 120 may be configured to wirelessly receive digital messages via the RF signals 108 (e.g., from the system controller 110) and to control the respective lighting load 122 in response to the received digital messages. Examples of dimmer switches operable to transmit and receive digital messages is described in greater detail in commonly-assigned U.S. Patent Application Publication No. 2009/0206983, published Aug. 20, 2009, entitled COMMUNICATION PROTOCOL FOR A RADIO-FREQUENCY LOAD CONTROL SYSTEM, the entire disclosure of which is hereby incorporated by reference.

The load control system 100 may comprise one or more remotely-located load control devices, such as light-emitting diode (LED) drivers 130 for driving respective LED light sources 132 (e.g., LED light engines). The LED drivers 130 may be located remotely, for example, in or adjacent to the lighting fixtures of the respective LED light sources 132. The LED drivers 130 may be configured to receive digital messages via the RF signals 108 (e.g., from the system controller 110) and to control the respective LED light sources 132 in response to the received digital messages. The LED drivers 130 may be configured to adjust the color temperature of the respective LED light sources 132 in response to the received digital messages. Examples of LED drivers configured to control the color temperature of LED light sources are described in greater detail in commonly-assigned U.S. Patent Application Publication No. 2014/0312777, published Oct. 23, 2014, entitled SYSTEMS AND METHODS FOR CONTROLLING COLOR TEMPERATURE, the entire disclosure of which is hereby incorporated by reference. The load control system 100 may comprise other types of remotely-located load control devices, such as, for example, electronic dimming ballasts for driving fluorescent lamps.

The load control system 100 may comprise one or more plug-in load control devices 140, for controlling respective plug-in electrical loads. For example, a plug-in lighting load, such as a floor lamp 142 or a table lamp, may be plugged into one of the plug-in load control devices 140, such that the plug-in load control device is coupled in series between the AC power source and the plug-in lighting load. The plug-in load control device 140 may be configured to receive digital messages via the RF signals 108 (e.g., from the system controller 110) and to turn on and off or adjust the intensity of the plug-in lighting load in response to the received digital messages. An appliance, such as a television 144, may be plugged into one of the plug-in load control devices 140, and the plug-in load control device may be configured to turn the appliance on and off in response to the digital messages received via the RF signals 108.

Alternatively or in addition, the load control system 100 may comprise controllable receptacles for controlling plug-in electrical loads plugged into the receptacles. The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150, such as motorized cellular shades, for controlling the amount of daylight entering the building in which the load control system is installed. The motorized window treatments 150 may be configured to receive digital messages via the RF signals 108 (e.g., from the system controller 110) and may be configured to adjust the position of a window treatment fabric in response to the received digital messages. The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control device.

The load control system 100 may comprise one or more temperature control devices 160 (e.g., thermostats) for controlling a room temperature in each of the rooms 102, 104, 106. A temperature control device 160 may be coupled to a heating, ventilation, and air conditioning (HVAC) system 162 via a control link (e.g., an analog control link or a wired digital communication link). The temperature control device 160 may be configured to wirelessly communicate digital messages with a controller of the HVAC system 162. The temperature control device 160 may comprise a temperature sensor for measuring the room temperature of the respective room 102, 104, 106 and may control the HVAC system 162 to adjust the temperature in the room to a respective setpoint temperature.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; hydraulic valves for use in radiators and a radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as battery-powered remote control devices 170, occupancy sensors 172, and/or daylight sensors 174. The input devices may be fixed or movable input devices. The battery-powered remote control devices 170, the occupancy sensors 172, and/or the daylight sensors 174 may be wireless control devices (e.g., RF transmitters) configured to transmit digital messages via the RF signals 108 to the system controller 110 (e.g., directly to the system controller). For example, the battery-powered remote control device 170 may be configured to transmit digital messages to the system controller 110 via the RF signals 108 in response to an actuation of one or more buttons of the battery-powered remote control device. The system controller 110 may be configured to transmit one or more digital messages to the load control devices (e.g., the dimmer switches 120, the LED drivers 130, the plug-in load control devices 140, the motorized window treatments 150, and/or the temperature control devices 160) in response to the digital messages received from the battery-powered remote control devices 170, the occupancy sensors 172, and/or the daylight sensors 174. The battery-powered remote control devices 170, the occupancy sensors 172, and/or the daylight sensors 174 may be configured to transmit digital messages directly to the dimmer switches 120, the LED drivers 130, the plug-in load control devices 140, the motorized window treatments 150, and the temperature control devices 160. The input devices may also comprise a door entrance sensor, a door movement sensor, or a keycard door opening device.

The occupancy sensors 172 may be configured to detect occupancy and vacancy conditions in the rooms 102, 106 in which the occupancy sensors are mounted. The occupancy sensors 172 may transmit digital messages to the system controller 110 via the RF signals 108 in response to detecting the occupancy or vacancy conditions. The system controller 110 may be configured to turn one or more of the lighting loads 122 and the LED light sources 132 on and off in response to receiving an occupied command and a vacant command, respectively. The occupancy sensors 172 may operate as vacancy sensors, such that the lighting loads are turned off in response to detecting a vacancy condition (e.g., and not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensors 174 may be configured to measure a total light intensity in the room 102, 104 in which the daylight sensor is installed. The daylight sensors 174 may transmit digital messages, including the measured light intensity for example, to the system controller 110 via the RF signals 108 for controlling the intensities of one or more of the lighting loads 122 and the LED light sources 132 in response to the measured light intensity. Examples of RF load control systems having daylight sensors are described in greater detail in commonly-assigned U.S. Pat. No. 8,410, 706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control system 100 may comprise one or more wireless temperature sensors 190 located in the rooms 102, 104, 106 for measuring the room temperatures. The temperature sensors 190 may communicate via wired and/or wireless communications with the system controller 110 and/or the temperature control devices 160. Though the temperature sensors 190 are external to the temperature control devices 160, the temperature sensors 190 may be incorporated in the temperature control devices 160. The HVAC system 162 may be controlled by the temperature control devices 160 (e.g., in response to sensor information from the temperature sensors 190, instructions from the system controller 110, actuation of one or more buttons by a user, etc.). The HVAC system 162 may turn a compressor on and off for cooling the rooms 102, 104, 106 and to turn a heating source on and off for heating the rooms in response to the control signals received from the temperature control devices 160. The HVAC system 162 may turn a fan of the HVAC system on and off in response to the control signals received from the temperature control devices 160. The temperature control devices 160 and/or the HVAC system 162 may be configured to control one or more controllable dampers to control the air flow in each of the rooms 102, 104, 106.

The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential controllers, commercial controllers, industrial controllers, and/or any combination thereof.

The system controller 110 may be configured to be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link).

The system controller 110 may be configured to communicate via the network with one or more mobile devices 182, such as, a personal computing device and/or a wearable wireless device. The mobile device 182 may be located on an occupant 180, for example, may be attached to the occupant's body or clothing or may be held by the occupant.

The mobile device 182 may be characterized by a unique identifier (e.g., a serial number or address stored in memory) that uniquely identifies the mobile device 182 and thus the occupant 180. Examples of personal computing devices may include a smart phone (e.g., an iPhone® smart phone, an Android® smart phone, or a Blackberry® smart phone), a laptop, and/or a tablet device (e.g., an iPad® hand-held computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). In addition, the system controller 110 may be configured to communicate via the network with one or more other control systems (e.g., a building management system, a security system, etc.).

The mobile device 182 may be configured to transmit digital messages to the system controller 110, for example, in one or more Internet Protocol packets. For example, the mobile device 182 may be configured to transmit digital messages to the system controller 110 over the LAN and/or via the Internet. The mobile device 182 may be configured to transmit digital messages over the Internet to an external service (e.g., If This Then That (IFTTT®) service), and then the digital messages may be received by the system controller 110. The mobile device 182 may transmit the RF signals 108 via a Wi-Fi communication link, a Wi-MAX communications link, a Bluetooth® communications link, a near field communication (NFC) link, a cellular communications link, a television white space (TVWS) communication link, or any combination thereof. Alternatively or additionally, the mobile device 182 may be configured to transmit RF signals according to the proprietary protocol.

The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using, for example, the mobile device 182 or other network device (e.g., when the mobile device is a personal computing device) during a configuration (or commissioning) procedure. The mobile device 182 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED drivers 130, the plug-in load control devices 140, the motorized window treatments 150, and/or the temperature control devices 160). The load control database may comprise information regarding associations between the load control devices and the input devices (e.g., the battery-powered remote control devices 170, the occupancy sensors 172, and/or the daylight sensors 174). The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosures of which are hereby incorporated by reference.

The mobile device 182 may comprise one or more sensing devices for sensing one or more parameters (e.g., biometric data) that define the physical condition (e.g., behavior, movement, comfort, and/or health) of the occupant 180. For example, the sensing devices of the mobile device 182 may include an accelerometer for monitoring the movement of the occupant 180. The mobile device 182 may comprise sensing devices for monitoring the heart rate, the blood pressure, the body temperature, the blood sugar, and/or the perspiration level of the occupant 180. The mobile device 182 may include any combination of sensing devices. The mobile device 182 may be configured to transmit digital messages to the system controller 110 including data regarding the parameters measured by the sensing devices of the mobile device 182.

The system controller 110 may be configured to deduce the state or physical condition of the occupant 180 using the parameters measured by the sensing devices of the mobile device 182. For example, the system controller 110 may be configured to determine that the occupant 180 is sleeping or that the stress level of the occupant 180 is increasing in response to one or more of the parameters measured by the sensing devices of the mobile device 182.

The system controller 110 may be configured to determine the location of the mobile device 182 and/or the occupant 180. The system controller 110 may be configured to control (e.g., automatically control) the load control devices (e.g., the dimmer switches 120, the LED drivers 130, the plug-in load control devices 140, the motorized window treatments 150, and/or the temperature control devices 160) in response to determining the location of the mobile device 182 and/or the occupant 180. The system controller 110 may be configured to control the load control devices according to occupant control parameters associated with the occupant 180. The occupant control parameters may be predetermined or preset settings for the occupant 180, biometric data for the occupant 180, user input data received from the occupant 180 via the mobile device 182, and/or an environmental characteristic measured by the mobile device 182 (e.g., an ambient light level).

One or more of the control devices of the load control system 100 may transmit beacon signals, for example, RF beacon signals transmitted using a short-range and/or low-power RF technology, such as Bluetooth® technology (e.g., via a short-range communication link). The load control system 100 may comprise one or more beacon transmitting devices 184 for transmitting the beacon signals (e.g., dedicated beacon transmitting devices). The beacon transmitting devices 184 may be battery-powered (e.g., including a battery for powering the beacon transmitting device). The beacon transmitting device 182 may also be plugged into a receptacle to receive AC power and/or may be connected to an external power supply for receiving DC power. Any fixed-location control device of the load control system 100 (e.g., any of the load control devices, such as the dimmer switches 120, the LED drivers 130, the motorized window treatments 150, and/or the temperature control devices 160) may be also be configured to transmit the beacon signals (e.g., to operate beacon transmitting devices).

The mobile device 182 may be configured to receive a beacon signal when located near a control device that is presently transmitting the beacon signal. A beacon signal may comprise a unique identifier identifying the location of the load control device that transmitted the beacon signal. Since the beacon signal may be transmitted using a short-range and/or low-power technology, the unique identifier may indicate the approximate location of the mobile device 182. The mobile device 182 may be configured to transmit the unique identifier to the system controller 110, which may be configured to determine the location of the mobile device 182 using the unique identifier (e.g., using data stored in memory or retrieved via the Internet). The system controller 110 may be configured to transmit control data (e.g., the determined location and/or names of an area, groups, zones, electrical loads, control devices, load control devices, input devices, presets, and/or scenes associated with the location) back to the mobile device 182 and/or control (e.g., automatically control) the load control devices in response to the location of the mobile device.

The system controller 110 may be configured to determine the location of the mobile device 182 using triangulation. Since the load control devices of the load control system 100 may be mounted in fixed locations, the load control devices may measure the signal strength of RF signals received from the mobile device 182. The load control devices may transmit these signals strengths to the system controller 110, which may be configured to determine the location of the mobile device 182 using the signal strengths. One or more load control devices of the load control system 100 may be movable devices. As such, the load control system 100 may comprise fixed and movable load control devices.

The system controller 110 may be configured to determine the location of the occupant 180 without the need to track the location of the mobile device 182. For example, the system controller 110 may be configured to determine the location of the occupant 180 in response to one or more input device fixedly mounted in one or more of the rooms 102, 104, 106, for example, a camera device 176, a microphone 192, or a fingerprint detection device 194. The load control system 100 may comprise one or more camera devices 176 for recording video surveillance of the rooms 102, 104, 106. Each camera device 176 may be configured to transmit video recordings to the system controller 110. The system controller 110 may be configured to determine the presence of the occupant 180 in the room 104, for example, using facial recognition technology.

The system controller 110 may be configured to determine the location of the occupant 180 using a microphone 192. For example, the system controller 110 may be configured to determine an occupant of a space based on matching voice patterns of the occupant 180 to a database of stored voice patterns, for example, in addition to a determined location of the occupant's mobile device 182. The load control system 100 may comprise one or more microphones 192 for recording audio in the rooms 102, 104, 106. A microphone 192 may be configured to transmit audio recordings to the system controller 110. The system controller 110 may be configured to determine the presence of the occupant 180 in the room 104 by processing the audio received from the microphone 192. For example, the system controller 110 may identify movement in the room 104, that a person is in the room 104, a number of people in the room 104, and/or a specific person in the room 104 from the audio received from the microphone 192. The volume of the audio received may indicate the relative distance of the occupant 180 from the microphone 192.

The system controller 110 may be configured to determine an occupant of a space based on fingerprint detection. The load control system 100 may include one or more fingerprint scanners 194. Though the fingerprint scanner 192 is illustrated as an external device, the fingerprint scanner 192 may be included in a control-source device. For example, a control-source device (e.g., a dimmer switch) may comprise a fingerprint scanner 194. Upon receiving information relating to an occupant's fingerprint, the control-source device may transmit this information to the system controller 110, which may cross-reference the occupant's fingerprint information with a database to determine the occupant of the space. The load control system 100 may comprise one or more fingerprint scanners 194 for detecting the fingerprint of the occupant 180 in the rooms 102, 104, 106. The identification of the fingerprint of the occupant 180 in the room 104 may indicate the location of the occupant 180. The mobile device 182 may also, or alternatively, be used to scan the fingerprint of the occupant 180. The fingerprint scanner 194 may be configured to transmit fingerprint data to the system controller 110. The system controller 110 may be configured to determine the presence of the occupant 180 in the room 104 by processing the fingerprint data to identify the fingerprint of the occupant 180.

The system controller 110 may be configured to use location information determined by the mobile device 182 to supplement occupancy sensor information. For example, an occupancy sensor may be unable to detect the presence of an occupant in a space due to a lack of line of sight between the sensor and the occupant 180. The system controller 110 may detect the presence of the occupant 180 based on the presence of the occupant's mobile device 182. The system controller 110 may use location information based on a mobile device 182 to enhance occupancy sensor zone control. For example, the location information relating to the mobile device 182 may be used to determine and/or confirm zoning information as determined by an occupancy sensor.

The system controller 110 may be configured to control (e.g., automatically control) the load control devices in response to determining the location of the mobile device 182, for example, when one of the occupancy sensors 172 indicates that the space (e.g., room), which was indicated as the location of the mobile device 182, is occupied. The mobile device 182 may be configured to directly receive a digital message indicating the occupancy condition from one of the occupancy sensors 172, to determine that the occupancy sensor is located in the room in which the mobile device 182 is located, and/or to transmit a command (e.g., instructions) to control the load control devices in the response to receiving the digital message indicating the occupancy condition (e.g., transmitted to the system controller 110 or directly to the load control devices). The system controller 110 may also be configured to determine the location of the mobile device 182 is occupied in response to a motion sensor, a proximity sensor, a door entrance sensor, a door movement sensor, a keypad door-opening device, or the camera device 176, and may control (e.g., automatically control) the load control devices when the location of the mobile device 182 is indicated as occupied.

A sensor (e.g., an occupancy sensor) may be configured to control the status of a control-target device (e.g., turn lights on/off, raise/lower shades, etc.) and the system controller 110 may be configured to determine and set the preset level of the control-target device based on the detection of a mobile device 182 within the space of the control-target device. For example, an occupancy sensor may turn the lighting of a space on/off based on the detection of an occupant 180, while the system controller 110 may set the lighting to the preset of the occupant 180 based on the detection of the occupant's mobile device 182 within the space of the control-target device.

A sensor (e.g., an occupancy sensor) may be configured to control the status of a control-target device in one direction (e.g., turn lights on/off, raise/lower shades, etc.) and the system controller 110 may be configured to control the status of the control-target device in the other direction. For example, the system controller 110 may turn lighting of a space on based on determining that an occupant is present in the space (e.g., via their mobile device 182) and the sensor may be configured to turn the lighting of the space off based on a detected vacancy situation in the space.

The mobile device 182 may be configured to determine its location and to transmit the location information to the system controller 110 and/or the load control devices. The mobile device 182 may be configured to determine its location in response to the beacon signals received when located near a control device that is presently transmitting the beacon signal. The mobile device 182 may also be configured to use the unique identifier of the beacon signal to retrieve the location of the mobile device 182 via the Internet. The mobile device 182 may be configured to transmit the location to the system controller 110, which may be configured to automatically control the load control devices in response to the location of the mobile device 182. The mobile device 182 may be configured to determine its location based on the signal strengths of RF signals received directly from three or more of the load control devices. The mobile device 182 may be configured to determine its location based on a global positioning system (GPS) receiver.

An input device (e.g., the battery-powered remote control devices 170, the occupancy sensors 172, and/or the daylight sensors 174) may be configured to determine its location. The input device may be configured to determine its location in response to determining a signal strength signature at the present location. The signal strength signature may be a pattern of signal strength measurements to and from the fixed-location control devices (e.g., the load control devices) of the load control system 100. The input device may be configured to use a neural network to learn a signal strength signature in each of the rooms 102, 104, 106. For example, the input device may learn the signal strength signature using signal strengths measured when the input device is in one of the rooms 102, 104, 106 during a configuration or setup procedure of the load control system 100 to determine the weights of the neural network that will allow the input device to recognize these patterns. The input device may alter its operation in response to the determined location and/or transmit the determined location to the load control devices and/or system controller 110. The input devices and/or the system controller 110 may be configured to determine the locations of the input devices using any of the procedures described herein.

The mobile device 182 and/or the input devices (e.g., such as the battery-powered remote control devices 170) may be configured to operate differently depending upon the present location of the device. The mobile device 182 may be configured to display a control screen (e.g., on a visual display) that allows for control of the electrical loads located near the location of the mobile device 182. The control screen may be displayed when a control application on the mobile device 182 is opened. The control screen may be displayed without opening the control application, for example, on a lock screen, a notification screen, or a "glance" screen. The system controller 110 may be configured to transmit location-dependent control elements (e.g., the determined location and/or names of an area, groups, zones, electrical loads, control devices, load control devices, input devices, presets, and/or scenes associated with the location) to the mobile device 182. The mobile device 182 may display the location-dependent control elements on the display screen (e.g., as "soft" buttons), and may transmit selected control elements to the system controller 110. For example, if the mobile device 182 is located in a conference room, the control screen may display the name of the conference room, one or more scenes for the conference room, and/or specific zones of the conference room. The mobile device 182 may also display generic control elements on the control screen (e.g., without the need for the system controller to transmit location-dependent control elements to the mobile device 182). For example, in an open office area, the generic control elements for each cubicle may be the same (e.g., an on control element, an off control element, a raise control element, and a lower control element). The mobile device 182 may transmit the selected control element to the system controller 110, which may determine the appropriate command to transmit to the appropriate load control devices depending upon the determined location of the mobile device 182. The system controller 110 may have stored an association of locations identifiers to load control device identifiers for reference to control the load control devices associated with a given location.

When the control application on the mobile device 182 is opened, the mobile device may also be configured to display a home screen that is dependent upon the location of the mobile device 182. For example, the mobile device 182 may be configured to display a "living room" home screen when the mobile device 182 is presently located in the living room. The mobile device 182 may be configured to launch a particular application and/or screen of an application based on the location of the mobile device 182. For example, if the mobile device 182 detects that it is in a conference room, the mobile device 182 may launch a particular application and/or screen of an application that allows for control of the particular loads of the conference room (e.g., HVAC, lighting, blinds, etc.).

The mobile device 182 may be configured to re-order lists or formats of electrical loads, load control devices, input devices, control buttons, and/or presets displayed on the visual display in response to the location of the mobile device 182. The mobile device 182 may display the items in a list in a different order or in a different location on the display in response to detecting different locations of the mobile device 182. For example, the mobile device 182 may determine the more commonly selected items for a respective location and may display the more commonly selected items in a more convenient location on the display (e.g., higher in a displayed list, closer to the top of the displayed list, or closer to a side of the display for easier access for selection by the user) when the mobile device 182 is at or near (e.g., within a predefined distance of) the location. The mobile device 182 may store the number of times different items are selected and may re-configure the display configuration for the items when an item is selected more than another item (e.g., more than a predefined number of times to prevent reconfiguration each time an item is selected more than another). The mobile device 182 may be configured to display messages and/or warnings to the occupant 180 depending upon the present location, for example, to inform the occupant of burnt-out lamps or faulty control devices in the present room. The mobile device 182 may be able to display a warning when the time-of-day pricing for electricity has exceeded a predetermined threshold.

The mobile device 182 may use the location of the device to determine the display configuration and/or warnings for being displayed at or near the location. The mobile device 182 may determine the location locally (e.g., via geolocation, triangulation, beacons, etc.) or as an indication from the system controller 110. The system controller 110 may also, or alternatively, determine the location of the mobile device 182 and may provide the display, lists, and/or warnings to the mobile device 182 for display on the mobile device.

Figure 2:
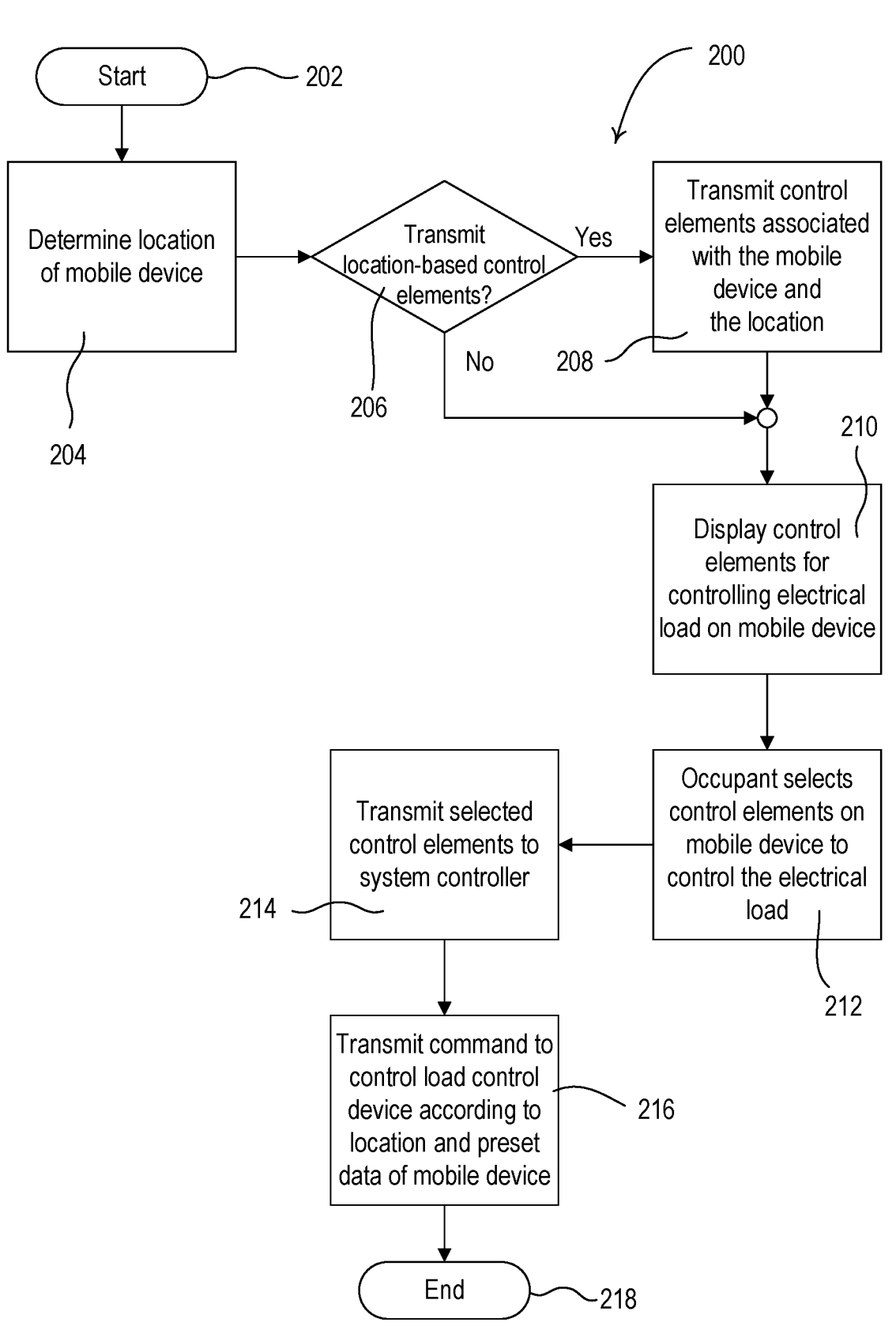
FIG. 2 is a flowchart of an example control procedure for controlling electrical loads in response to the location of a mobile device and/or an occupant.

FIG. 2 is a flowchart of an example control procedure 200 for controlling electrical loads in response to the location of the mobile device 182. At 202, the example control procedure 200 may start. At 204, the location of the mobile device 182 may be determined. For example, the location of the mobile device 182 may be determined at 204 by the mobile device 182 receiving a beacon signal, the mobile device 182 transmitting a unique identifier of the beacon signal (e.g., a beacon ID) to the system controller 110, and the system controller 110 determining the location of the mobile device 182 using the beacon ID. In addition, the system controller 110 may determine a location of a mobile device 182 using one or a combination of triangulation, received signals from the mobile device 182, a sensor, a camera, beacon signals, a microphone, fingerprint detection, and/or the like.

If the location-based control elements are determined to be transmitted to the mobile device 182 at 206 (e.g., in order to provide control of the electrical loads at the location of the mobile device 182), the system controller 110 may transmit control data associated with the mobile device and the location of the mobile device to the mobile device 182 at 208. For example, the system controller 110 may transmit the location-based control elements (e.g., the determined location and/or names of areas, groups, zones, electrical loads, control devices, load control devices, input devices, presets, and/or scenes associated with the location) to the mobile device 182 at 208. The location-based control elements may be requested or required by the mobile device 182 or transmitted based on the location of the mobile device 182. The mobile device 182 may receive the location-based control elements and display the location-based control elements on the visual display of the mobile device 182 at 210 to allow for control of the electrical loads near the location of the mobile device 182. For example, if the mobile device 182 is located in a conference room, the control screen may display the name of the conference room, one or more scenes for the conference room, and/or specific zones of the conference room.

At 212, the occupant may select one or more of the location-based control elements on the visual display of the mobile device 182. For example, the occupant may press a button to turn the load on or off, or select a preset or scene on the visual display of the mobile device 182 at 212. In addition, the occupant may actuate a virtual slider on the visual display of the mobile device 182 to adjust the amount of power delivered to the electrical load (e.g., to adjust an intensity of a lighting load) at 212. At 214, the mobile device 182 may transmit the selected control element (e.g., a command to control the electrical load) to the system controller 110. At 216, the system controller 110 may transmit a digital message to one or more of the load control devices near the location of the mobile device 182 to control the electrical loads, before the control procedure 200 exits at 218. The digital message transmitted at 216 may include a command (e.g., instructions) to control the electrical load according to the determined location of the mobile device 182 and/or the occupant control parameters stored in the mobile device 182.

If the location-based control elements are not to be transmitted at 206 (e.g., based on the location of the mobile device 182, or a request or requirement of the mobile device 182), the mobile device 182 may simply display the generic control elements on the visual display of the mobile device 182 at 210 to allow for control of the electrical loads near the location of the mobile device 182. For example, if the mobile device 182 is located in an open office, the control screen may display the same generic control elements for each cubicle. The occupant may select one or more of the generic control elements on the visual display of the mobile device 182 at 212, and the mobile device 182 may transmit the selected control element to the system controller 110 at 214. At 216, the system controller 110 may determine an appropriate command (e.g., instructions) in response to the selected control elements and the location of the mobile device 182 and then transmit a digital message including the command to one or more of the load control devices near the location of the mobile device 182, before the control procedure 200 exits at 218.

The battery-powered remote control devices 170 and/or the system controller 110 may be configured to transmit different digital messages in response to the actuation of a button or buttons on the remote control devices 170 depending upon the location of the remote control devices 170. For example, actuation of a preset button of one of the remote control devices 170 may select a first preset when the remote control devices 170 are located in a first room and may select a second preset when the remote control device is located in a second room. The remote control devices 170 may be configured to identify a location (e.g., by identifying a beacon, etc.) and transmit different digital messages (e.g., to different devices and/or including different commands) to the control-target devices based on the location. The system controller 110 may identify the location of the remote control devices 170 (e.g., by identifying a beacon, etc.) and transmit different digital messages (e.g., to different devices and/or including different commands) to the control-target devices based on the location.

Figure 3:
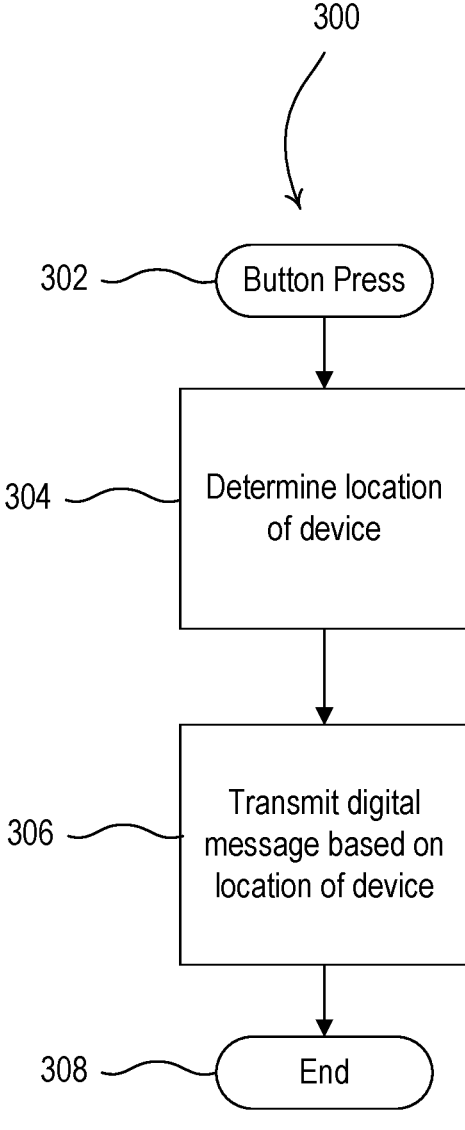
FIG. 3 is a flowchart of an example button press procedure that may be executed by a remote control device.

FIG. 3 is a flowchart of an example button press procedure 300 that may be executed by the remote control devices 170, the mobile device 182, and/or the system controller 110. At 302, a button on a remote control device 170 or a mobile device 182 may be actuated. At 304, the remote control device 170, the mobile device 182, and/or the system controller 110 may determine the location of the remote control device 170 or the mobile device 182. At 306, the remote control device 170, the mobile device 182, and/or the system controller 110 may transmit a digital message based on the location of the remote control device 170 or the mobile device 182. For example, the remote control device 170 or the mobile device 182 may transmit different digital messages (e.g., for controlling different devices and/or different instructions for control) in response to the actuation of a single button or buttons depending upon its location. The remote control device 170 or the mobile device 182 may transmit different digital messages that indicate the devices location and the system controller 110 may transmit different load control messages (e.g., for controlling different devices and/or different instructions for control) to load control devices in the identified location. At 308, the example button press procedure 300 may end.

The system controller 110 may be configured to control (e.g., automatically control) the load control devices in response to determining the location of the mobile device 182 and/or the occupant 180. As previously mentioned, the system controller 110 may be configured to control the load control devices according to the occupant control parameters associated with the occupant 180. The occupant control parameters may be the occupant's predetermined or preset settings that may be stored on the mobile device 182 and/or on the system controller 110, the occupant's biometric data that may be sensed by the mobile device 182 (e.g., when the mobile device 182 is a wearable device), the occupant's input data that may be received via the mobile device 182, and/or data measured by the mobile device 182 (e.g., an ambient light level). A preset setting may identify preset lighting intensities of the lighting loads, preset positions of the motorized window treatments 150, and/or preset setpoint temperatures of the temperature control devices 160.

The system controller 110 may control the load control devices in the rooms according to the occupant control parameters as the occupant 180 moves around the building (e.g., to "follow" the occupant around the building). The occupant control parameters may be "universal" parameters (e.g., the preset settings may be the same for each room of the building), or may be room parameters (e.g., the preset settings may be different for each room). The occupant control parameters may be determined based on the time of day and/or year. For example, the lighting loads 122 and LED light sources 132 may automatically be illuminated dimly when controlled (e.g., automatically controlled) at night in response to the location of the mobile device 182 and/or occupant 180. The level at which the load control devices and/or electrical loads are controlled may be dependent upon the distance from the mobile device 182 and the controlled load control device and/or electrical load. Since the mobile device 182 may uniquely identify the occupant 180, the occupant control parameters may be different for different occupants of the rooms.

The occupant control parameters may be stored in memory on the mobile device 182 and/or in memory on the system controller 110. The load control device being controlled may receive the occupant control parameters when a command to control the electrical load is received by the load control device. The load control device may retrieve the occupant control parameters from the mobile device 182 (e.g., using a short-range and/or low-power RF technology, such as Bluetooth® technology) and/or from the system controller 110 (e.g., via the RF signals 108). For example, the load control device may receive a digital message (e.g., via the RF signals 108) that includes the command to control the load along with the occupant control parameter. The load control device may comprise a button and may be configured to retrieve the occupant control parameters from the mobile device 182 when the button is actuated. For example, if the load control device is a dimmer switch having a toggle button, the load control device may be configured to retrieve a preset intensity for a lighting load from the mobile device 182 when the toggle button is actuated to turn the lighting load on.

Figure 4:
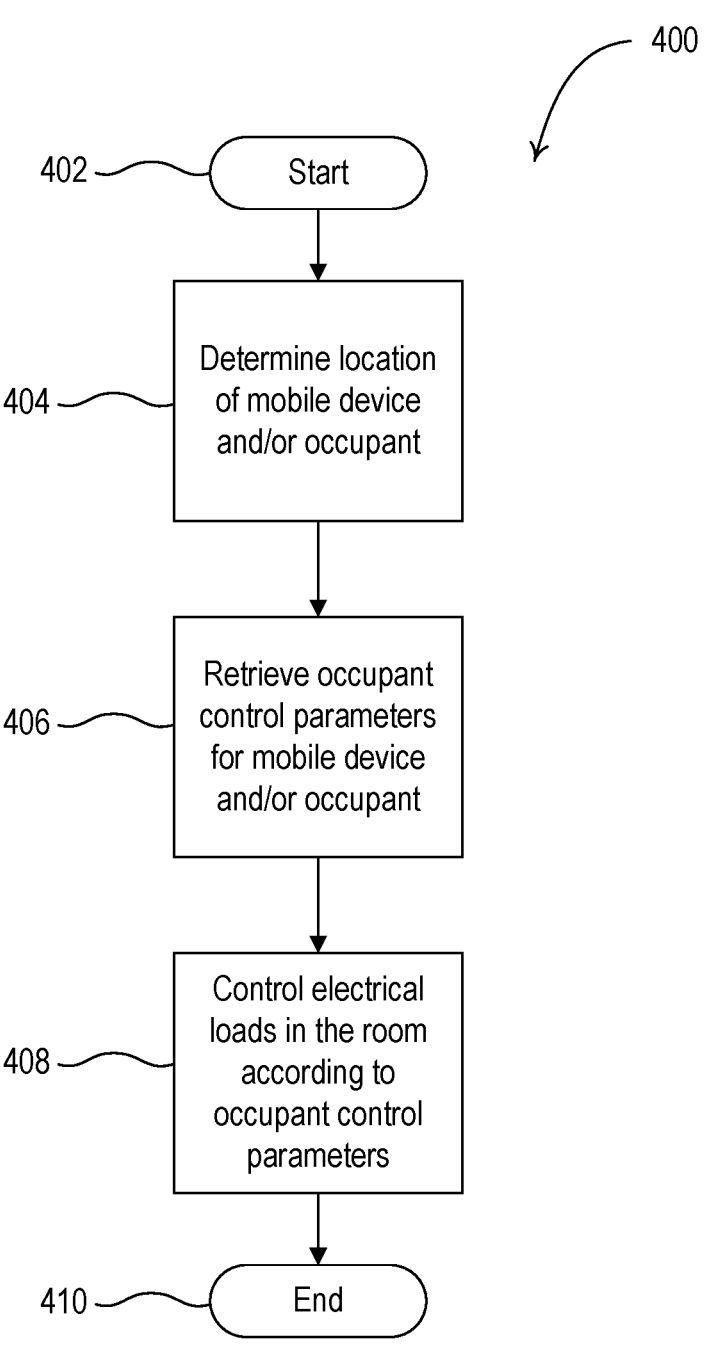
FIG. 4 is a flowchart of an example control procedure for controlling (e.g., automatically controlling) electrical loads in response to the location of a mobile device and/or an occupant.

FIG. 4 is a flowchart of an example control procedure 400 for controlling (e.g., automatically controlling) electrical loads in response to the location of the mobile device 182 and/or the occupant 180. For example, the control procedure 400 may be executed by the system controller 110. At 402, the example control procedure 400 may start. At 404, the system controller 110 may determine a location of a mobile device 182 and/or occupant 180. For example, the system controller 110 may determine a location of a mobile device 182 and/or occupant 180 using one or a combination of triangulation, received signals from the mobile device 182, a sensor, a camera, beacon signals, a microphone, fingerprint detection, and/or the like.

At 406, the system controller 110 may recall (e.g., load) preset settings based on the mobile device 182 and/or occupant 180, for example, as described herein. At 408, the system controller 110 may control (e.g., automatically control) electrical loads in the space (e.g., room) according to the recalled preset settings of the mobile device 182 and/or occupant 180. For example, the system controller 110 may automatically control electrical loads in the room according to predetermined or preset settings for the occupant 180, which may be room specific settings. At 410, the example control procedure 400 may end.

When there are multiple occupants in a single room, the system controller 110 may be configured to determine an identify of each of the multiple occupants and to control (e.g., automatically control) one or more of the load control devices according to the occupant control parameters associated with each of the multiple occupants. For example, the system controller 110 may be configured to control (e.g., automatically control) one or more of the load control devices using a priority (e.g., a predetermined priority, such as a tiered hierarchy) of occupants to determine which occupant's preset settings get priority. For example, the system controller 110 may control the load control devices to a preset setting of the mobile device 182 and/or occupant in the room that has the highest priority. The priorities and/or tiered hierarchy may be determined during a configuration procedure of the load control system 100 and may be stored in memory in the system controller 110. The priority may be based on the location of the occupants within the space. For example, the occupant closest to or furthest from a door or window may be assigned the highest priority, the occupant closest to the load control device may be assigned the highest priority, the occupant closest the to load may be assigned the highest priority, the occupant closest to a presentation area (e.g., a podium or a white board), etc. In addition, the priority may be based on the order in which the occupants entered the space. For example, the system controller 110 may control one or more of the load control devices using the preset data and/or user input received from the mobile device 182 of the first occupant to enter the space. Further, the priority may be determined from a manual request to control the loads of the room, for example, using the mobile device 182 of the occupant. In addition, an occupant may relinquish control of the loads in the room using the mobile device 182 (e.g., manually select an input to relinquish control).

Figure 5:
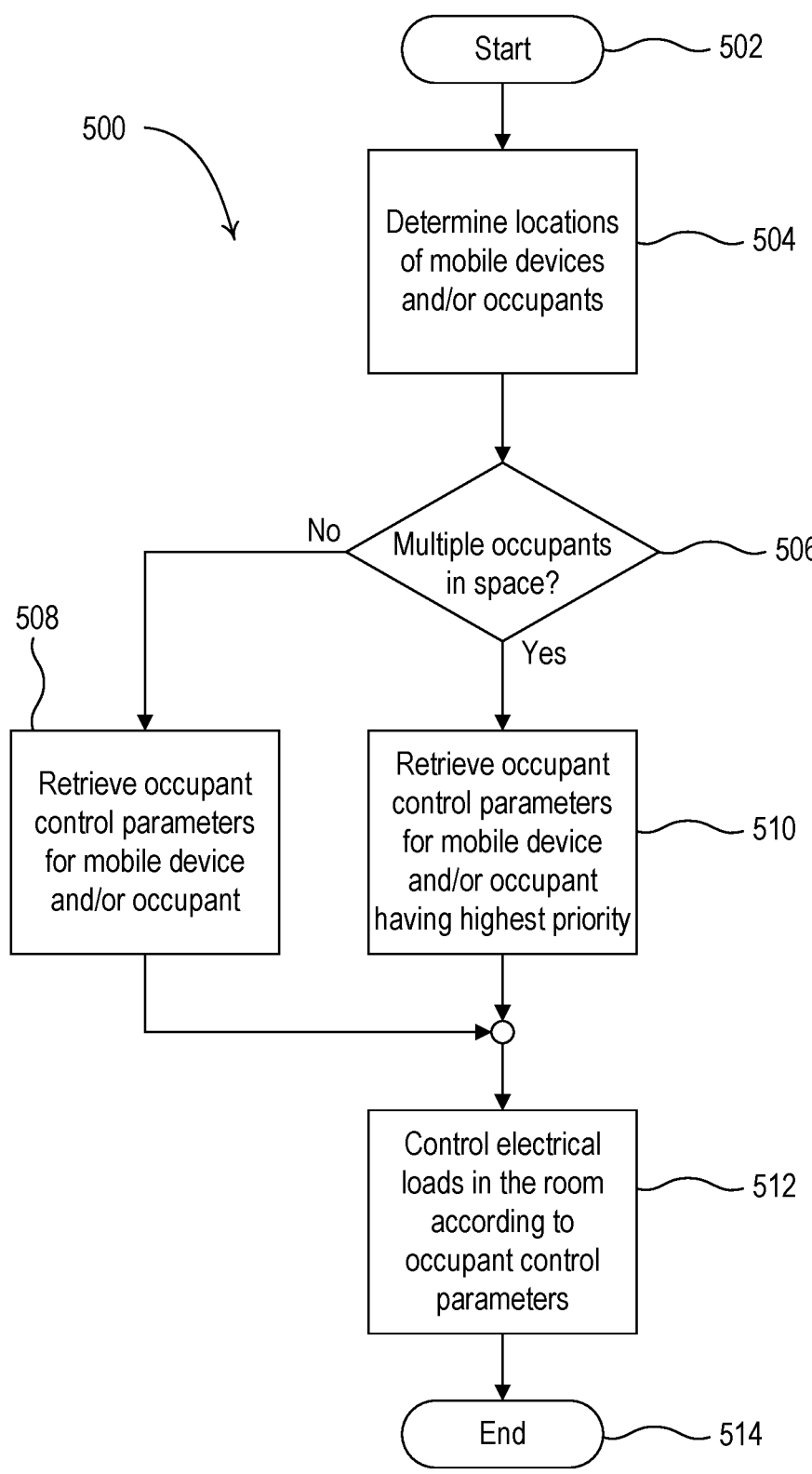
FIG. 5 is a flowchart of an example control procedure for controlling electrical loads in response to the location of one or more mobiles devices and/or occupants when there may be multiple mobile devices and/or occupants in a single space.

FIG. 5 is a flowchart of an example control procedure 500 for controlling (e.g., automatically controlling) electrical loads in response to the location of one or more mobiles devices and/or occupants when there may be multiple mobile devices and/or occupants in a single space. For example, the control procedure 500 may be executed by the system controller 110. At 502, the example control procedure 500 may start. At 504, the system controller 110 may determine the location of one or more mobile devices 182 and/or occupants 180, for example, as described herein. At 506, the system controller 110 may determine if multiple occupants are in the space. The system controller 110 may determine occupancies based on the presence of an occupant's mobile device 182, a sensor, etc. If the system controller 110 determines that there is one occupant 180 in the space, then at 508 the system controller 110 may recall preset settings for the mobile device 182 and/or the occupant 180 accordingly, for example, as described herein.

If the system controller 110 determines that there are multiple occupants 180 in the space at 506, then at 510 the system controller 110 may recall preset settings for the mobile device 182 and/or the occupant 180 having the highest priority, for example, as described herein. At 512, the system controller 110 may control (e.g., automatically control) one or more control-target devices (e.g., electrical loads) according to the preset settings of the occupant 180 having the highest priority. At 514, the example control procedure 500 may end.

Though FIG. 5 describes the system controller 110 controlling one or more electrical loads when one or more occupants are detected in a space, the system controller 110 may determine the absence of occupants and may control the one or more electrical loads based on the absence of the occupants. For example, if no occupants are detected in a space, the system controller 110 may control the electrical loads in the space according to an "away" preset, which may control the electrical loads in a manner to save electricity.

The system controller 110 may control the one or more electrical loads based on a combined presence of multiple occupants. The system controller 110 may identify the combined presence of specific occupants (e.g., occupant identifiers) and may set a preset when the combined presence of the occupants are identified. For example, a "night" preset may be triggered when a husband and wife are identified in a bedroom (e.g., but not when one of the occupants is present). Different presets may be triggered when a combined total number of occupants (e.g., less than five, less than ten, etc.) are identified by the system controller 110 in a space.

The system controller 110 may identify an occupant as a visitor or guest. Visitors or guests may be identified generally when the identifier of the occupant and/or the occupant's mobile device is not stored at the system controller 110 or is associated with guest privileges. When the occupants are identified as visitors or guests, default guest preset settings and/or control elements may be implemented by the system controller 110 and/or the mobile device.

The system controller 110 may be configured to control (e.g., automatically control) the load control devices differently in response to the input devices of the load control system 100 depending upon the location of the mobile device 182. For example, the operation of the system controller 110 in response to actuation of the buttons of a remote control device (e.g., a wall-mounted keypad or visual display device) may depend upon the mobile device 182 (e.g., the occupant control parameters of the mobile device 182) located near the remote control device when the button is actuated. The system controller 110 may control the load control devices according to an occupant's predetermined set of scenes in response to actuations of the buttons of the remote control device when the mobile device 182 is located near the remote control device when the button is actuated. Further, the remote control device may display a predetermined user interface according to the occupant's preferences and/or occupant control parameters when the mobile device 182 located near (e.g., within a predefined range) the remote control device when the button is actuated.

The system controller 110 may be configured to automatically control the load control devices according to the occupant control parameters in response to determining the location of the mobile device 182 as well as determining that one of the occupancy sensors 172 has determined that the room in which the mobile device 182 is located in is occupied.

Figure 6:
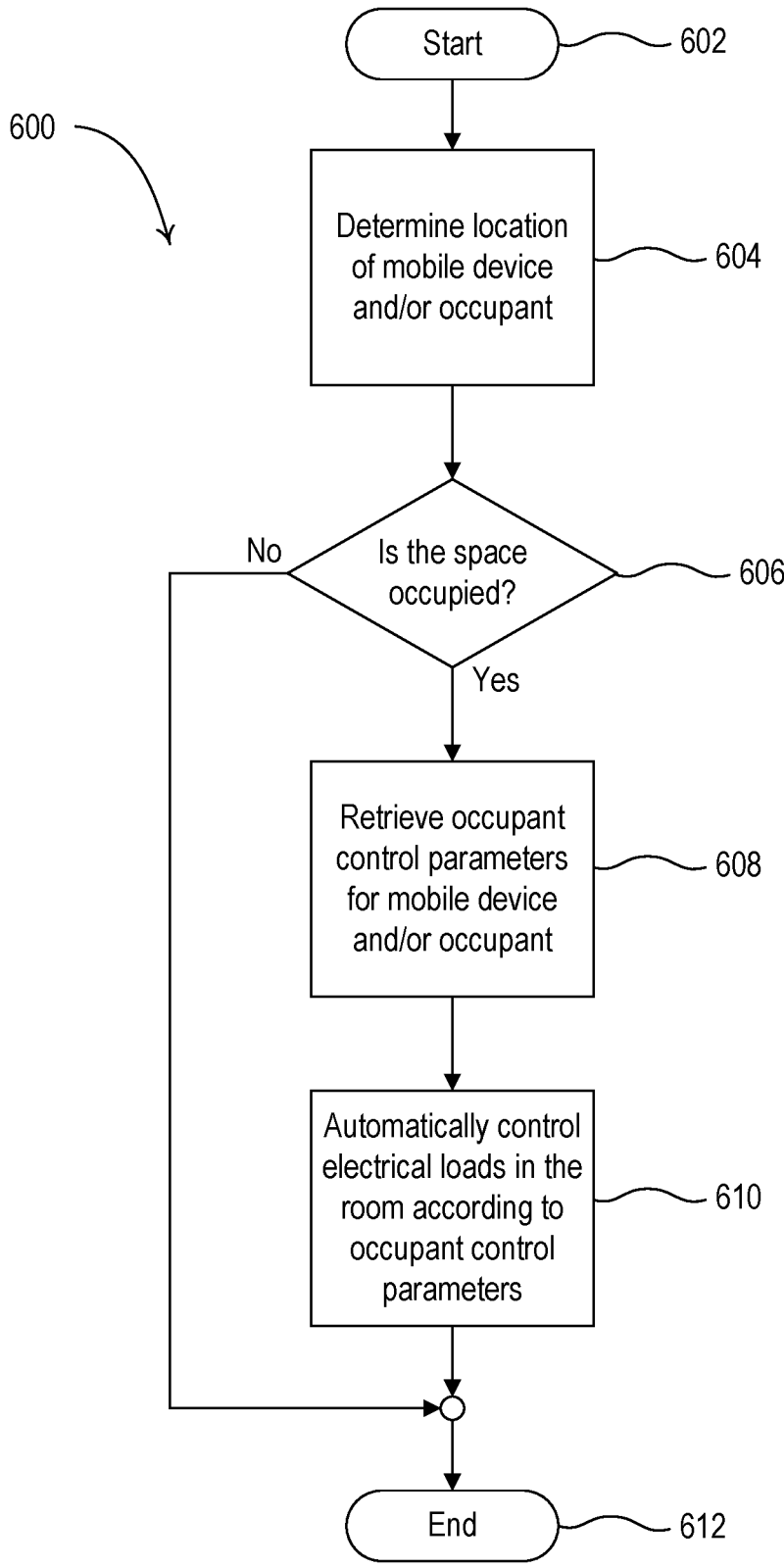
FIG. 6 is a flowchart of an example control procedure for automatically controlling electrical loads in response to the location of a mobile device and/or an occupant if the space in which the mobile device and/or occupant is located is occupied.

FIG. 6 is a flowchart of an example control procedure 600 for controlling (e.g., automatically controlling) one or more electrical loads in response to the location of the mobile device 182 and/or the occupant 180. For example, the control procedure 600 may be executed by the system controller 110. The example control procedure 600 may start at 602. At 604, the system controller 110 may determine the location of one or more mobile devices 182 and/or occupants 180. At 606, the system controller 110 may determine whether the space is occupied, for example, using information from the one or more mobile devices 182, sensor information, a camera, beacon signals, a microphone, fingerprint detection, etc. If the system controller 110 determines that the space is not occupied at 606, then the example control procedure 600 may end at 612.

If the system controller 110 determines that the space is occupied at 606, then at 608 the system controller 110 may recall preset settings for a mobile device 182 and/or occupant 180 located in the space, and control (e.g., automatically control) one or more control-target devices (e.g., electrical loads) according to the preset settings at 610. As such, the system controller 110 may be configured to control one or more electrical loads in response to the location of the mobile device 182 and/or the occupant 180 if the space in which the mobile device 182 and/or occupant 180 is located is occupied. The system controller 110 may be configured to control the load control devices and/or electrical loads in a room to save energy when the mobile device 182 is not located in the room (e.g., by turning off or reducing the amount of power delivered to the load control devices and/or electrical loads).

The system controller 110 may be configured to control (e.g., automatically control) the load control devices according to the occupant's preset settings in response to determining the location of the mobile device 182 when the occupant actuates a button on one of the load control devices (e.g., one of the dimmer switches 120) in the room in which the mobile device 182 is located. For example, the dimmer switch on which the button was actuated may be configured to determine the unique identifier of the mobile device 182 (e.g., the closest mobile device 182 if more than one mobile device 182 is determined to be present in the room) and to control the controlled lighting load in response to the occupant's preset settings (e.g., which may be stored in memory in the dimmer switch).

The system controller 110 may be configured to learn the preset settings for each occupant of the building. For example, each time that an occupant turns on a specific lighting load by actuating a button of the corresponding dimmer switch 120, the system controller 110 may be configured to store a desired intensity level to which the intensity of the lighting load was controlled as well as the unique identifier of the mobile device 182 that is presently located in the room of that specific dimmer switch (e.g., or the mobile device 182 closest to the dimmer switch if more than one mobile device 182 is determined to be present in the room). If the occupant repetitively controls the lighting load to the same desired intensity level upon entering the room, the system controller 110 may be configured to store the desired intensity level as the preset level in the room for that occupant. When the actuator of that specific dimmer switch is subsequently actuated and the occupant's mobile device 182 is located in the room of the dimmer switch, the system controller 110 may be configured to cause the dimmer switch to control the intensity of the lighting load to the desired intensity level (i.e., the preset level) that is stored in memory. The system controller 110 may be configured to cause (e.g., automatically cause) the dimmer switch to control the intensity of the lighting load to the desired intensity level when the occupant's mobile device 182 enters the room of the dimmer switch (e.g., without required actuation of the button of the dimmer switch).

The system controller 110 may be configured to control (e.g., predicatively control) one or more load control devices and/or electrical loads in response to detecting movement of an occupant 180. The system controller 110 may be configured to determine the direction in which the occupant 180 is moving (e.g., a trajectory of the occupant) in response to detecting that the mobile device 182 is moving through the building. For example, the system controller 110 may be configured to control the load control devices and/or the electrical loads at the intended destination of the occupant 180 to the occupant's preset settings before the occupant 180 arrives at the destination. The system controller 110 may be configured to learn the intended destination of the occupant 180 by monitoring the occupant's movements over a number of days. For example, the occupant 180 may get up in the middle of each night and walk to the kitchen for a glass of water. The system controller 110 may be configured to detect the occupant's movements and the time of day, and determine to predictively turn the lights on the kitchen and/or along the pathway to the kitchen. The system controller 110 may be configured to increase the intensity of lights along a predicted path of an occupant 180. For example, if the system controller 110 determines that an occupant 180 usually (e.g., more than a predetermined number of times) leaves his office and walks down the hall to a colleague's office, then the system controller 110 may control the intensity of the lights to be greater when that occupant leaves their office and their direction of movement is determined. The system controller 110 may also use time of day to adjust the intensity of the predicted path.

The system controller 110 may be configured to determine the velocity and/or momentum of the mobile device 182 and/or occupant 180, and control (e.g., automatically control) one or more load control devices and/or electrical loads in response to determining the velocity and/or momentum of the mobile device 182 and/or occupant 180. For example, the system controller 110 may be configured to turn lighting loads on or off quicker if an occupant is moving quickly through a building. In addition, the system controller 110 may be configured to determine that an occupant is running (e.g., an emergency condition may be occurring) and turn all of the lighting loads on to full intensity.

The system controller 110 may be configured to determine the location of a mobile device 182 and/or a remote control device 170 and react and/or respond when it is determined that the mobile device 182 and/or the remote control device 170 is in an authorized space (e.g., room, house, office building, etc.). As such, the system controller 110 may be configured to determine whether a device is attempting to control one of its control-target devices from an unauthorized location, for example, outside of a user's house, in an adjacent space or building, etc.

The system controller 110 may be configured to track occupants in restricted areas using their mobile device 182. For example, if the system controller 110 determines that an occupant has entered a restricted area, the system controller 110 may sound an alarm (e.g., visual, audio, etc.), indicate to the occupant that they are in a restricted area (e.g., flash the lights), provide a message via the occupant's mobile device 182, etc.

The system controller 110 may be configured to track occupants via their mobile device 182 during an emergency. For example, the system controller 110 may be configured to determine whether any occupants are in a building during an emergency, and if so, what floors, rooms, etc. As such, the system controller 110 may be configured to confirm whether or not all occupants are out of a space during an emergency situation.

The system controller 110 may be configured to calculate the utilization of different spaces (e.g., rooms) based on occupant tracking. For example, the system controller 110 may be configured to calculate the number of occupants (e.g., via their mobile device 182) in spaces of building over time. The system controller 110 may be configured to determine under and over utilized rooms based on this information. For example, this information may be further refined taking into consideration time of day, day of the week, etc. As such, the system controller 110 may be configured to determine whether additional space is required, whether particular spaces are being underutilized, etc.

The system controller 110 may be configured to determine the status of a hotel room based on information received from a mobile device 182. For example, a user may register their mobile device 182 with the hotel when checking in. The system controller 110 may be configured to determine whether the status of the user's hotel room (e.g., do not disturb, ready for service, unsold room) based on whether the mobile device 182 is in the room. The system controller 110 may indicate the hotels rooms that are "ready for service" based on a detection of the mobile device 182 within the room. For example, the system controller 110 may illuminate a light outside of the room, send a message to a mobile device 182 of the cleaning staff, etc.

The present application has been described with reference to the system controller 110 interacting between the control-source devices (e.g., the input devices) and the control-target devices (e.g., the load control devices). However, the control-source devices could transmit digital message directly to the control-target devices. In addition, while the present disclosure has been described with reference to the mobile device 182 and/or the input devices determining their locations, any of the control devices (e.g., including the load control devices) could be configured to determine its location. Further, the system controller 110 could be configured to determine the location of any of the control devices.

As previously mentioned, the mobile device 182 may comprise one or more sensing devices for sensing biometric data that defines the physical condition (e.g., behavior, movement, comfort, and/or health) of the occupant 180 when the mobile device 182 is a wearable wireless device. The system controller 110 may be configured to automatically control the load control devices (e.g., the dimmer switch 120, the LED drivers 130, the plug-in load control devices 140, the motorized window treatments 150, and/or the temperature control devices 160) and/or electrical loads in response to the parameters measured by the sensing devices of the mobile device 182. For example, the system controller 110 may be configured to turn on or off or adjust the intensity of the lighting loads 122 and/or the LED light sources 132 in response to the parameters measured by the sensing devices of the mobile device 182. The system controller 110 may be configured to adjust the color temperature of the LED light sources 132 in response to the parameters measured by the sensing devices of the mobile device 182. The system controller 110 may be configured to adjust the position of the motorized window treatments 150 in response to the parameters measured by the sensing devices of the mobile device 182. The system controller 110 may be configured to adjust the setpoint temperature of the HVAC system 162 and/or turn a fan of the HVAC system on or off in response to the parameters measured by the sensing devices of the mobile device 182.

The system controller may control the load control devices in response to the parameters measured by the sensing devices of the mobile device 182 to attempt to adjust the state or physical condition of the occupant 180. For example, if the system controller 110 determines that the stress level of the occupant 180 is increasing, the system controller may be configured to decrease the intensity of the lighting loads 122, adjust the color temperature of the LED light sources 132 to a cooler color, open the motorized window treatments 150, decrease the setpoint temperature of the HVAC system 162, and/or cause the speaker 146 to play soothing music or sounds. If the system controller 110 determines that the occupant 180 is quickly moving around the space, the system controller may be configured to increase the intensity of the lighting loads 122, and/or decrease the setpoint temperature of the HVAC system 162.

The amount that each load control device and/or electrical loads is controlled may be dependent upon the levels of the parameters measured by the sensing devices of the mobile device 182 (e.g., the exact stress level of the occupant 180). The system controller 110 may also determine how to control the load control devices and/or the electrical loads in response to the unique identifier of the mobile device 182. For example, the unique identifier may indicate a medical condition of the occupant 180, such that the system controller 110 is able to appropriately control the load control devices and/or the electrical loads in response to the parameters measured by the sensing devices of the mobile device 182.

The system controller 110 may be configured to control the load control devices and/or the electrical loads to save energy in response to the parameters measured by the sensing devices of the mobile device 182. The system controller 110 may be configured to determine that the occupant 180 has just fallen asleep in response to the parameters measured by the sensing devices of the mobile device 182 and to turn off and or reduce the amount of power delivered to one or more of the electrical loads.

The system controller 110 may be configured to control the load control devices and/or electrical loads in response to determining that the occupant 180 is asleep or awake. For example, the system controller 110 may be configured to determine that the occupant has just fallen asleep in response to the parameters measured by the sensing devices of the mobile device 182 and to turn off and/or reduce the amount of power delivered to one or more of the electrical loads (e.g., such as turning off the lighting loads 122, the television 144, a radio, etc.) The system controller 110 may be configured to adjust the setpoint temperature of the HVAC system 162 in response to the body temperature of the occupant 180 to ensure comfort of the occupant while sleeping. The system controller 110 may determine that the occupant 180 is asleep and is starting to wake up in response to the parameters measured by the sensing devices of the mobile device 182 and to then slowly increase the intensity of the lighting loads 122, adjust the color temperature of the LED light sources 132, and/or raise the motorized window treatments 150 to improve the experience of the occupant 180 while waking up.

The system controller 110 may be configured to control (e.g., automatically control) the load control devices and/or electrical loads to provide an alarm or warning in response to the parameters measured by the sensing devices of the mobile device 182. For example, the system controller 110 may be configured to blink the lighting loads 122 and/or generate an alarm with the speaker 146 in the vicinity of the occupant 180 and/or a caregiver of the occupant 180. For example, the system controller 110 may be configured to determine an abnormal condition with the occupant 180 while sleeping, and to blink the lighting loads 122 and/or generate an alarm with the speaker 146 in the vicinity of a caregiver of the occupant 180. The system controller 110 may be configured to blink the lighting loads 122 and/or adjust the color temperature of the LED light sources 132 in the vicinity of the occupant 180 to indicate the location of the occupant 180 to the caregiver.

Figure 7:
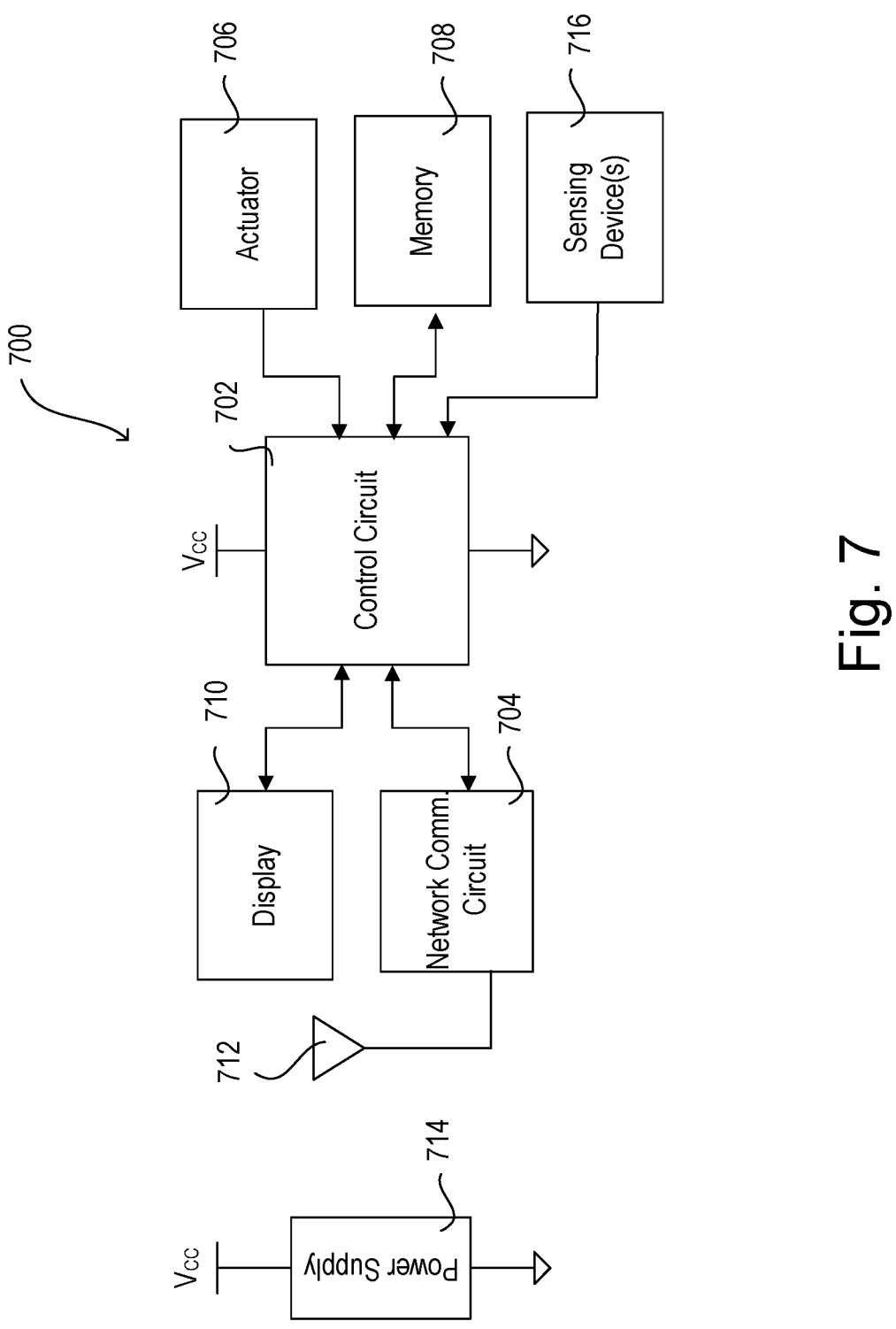
FIG. 7 is a simplified block diagram of an example network device.

FIG. 7 is a block diagram illustrating an example network device 700. The network device 500 may be a mobile device, such as the mobile device 182 shown in FIG. 1 for example, or another computing device. The network device 700 may be a personal computer (e.g., personal computer 164), a server, a laptop, a tablet, a smart phone, a control-source device (e.g., an input device), and/or other suitable network communication device (e.g., an Internet-Protocol-enabled device), for example. The network device 700 may be a wearable device. Examples of wearable wireless devices may include an activity tracking device (e.g., such as a FitBit® device, a Misfit® device, and/or a Sony Smartband® device), a smart watch, smart clothing (e.g., OMsignal® smartwear, etc.), and/or smart glasses (e.g., such as Google Glass® eyewear). The network device 700 may perform the functions of a control-source device (e.g., input device) in the load control system 100.

The network device 700 may comprise a control circuit 702, which may include one or more of a processor (e.g., a microprocessor), a microcontroller, a programmable logic device (PLD), a field programmable gate array (FPGA), an application specific integrated circuit (ASIC), or any suitable processing device. The control circuit 702 may perform signal coding, data processing, power control, image processing, input/output processing, and/or any other functionality that enables the network device 700 to perform as described herein.

The control circuit 702 may store information in and/or retrieve information from the memory 708. The memory 708 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 702 may access the memory 708 for executable instructions and/or other information that may be used by the network device 700. The control circuit 702 may access instructions in the memory 708 for performing as described herein.

The network device 700 may comprise a network communication circuit 704, which may be adapted to perform wired and/or wireless communications (e.g., with the system controller 110 or another device over a network) on behalf of the network device 700. The network communication circuit 704 may be a wireless communication circuit, for example, including an RF transceiver coupled to an antenna 712 for transmitting and/or receiving RF signals. The network communication circuit 704 may communicate using Wi-Fi, a proprietary protocol (e.g., the ClearConnect® protocol), Bluetooth®, or any other RF communications. The control circuit 702 may be coupled to the network communication circuit 704 for transmitting and/or receiving digital messages via the RF signals, for example.

The network device 700 may comprise an actuator 706. The control circuit 702 may be responsive to the actuator 706 for receiving a user input. For example, the control circuit 702 may be operable to receive a button press from a user on the network device 700 for making a selection or performing other functionality on the network device 700. The control circuit 702 may be responsive to receiving other user input (e.g., via software and/or actuation of a soft button on a display).

The network device 700 may comprise a display 710. The control circuit 702 may be in communication with a display 710 for displaying information to a user. The communication between the display 710 and the control circuit 702 may be a two way communication, as the display 710 may include a touch screen module capable of receiving information from a user and providing such information to the control circuit 702.

The control circuit 702 may sense information using the one or more sensing devices 718. The sensing devices 718 may sense one or more parameters (e.g., biometric data) that define the physical condition (e.g., behavior, movement, comfort, and/or health) of an occupant. For example, the sensing devices 718 may include an accelerometer for monitoring the movement of the occupant, devices for monitoring heart rate, devices for monitoring blood pressure, devices for monitoring body temperature, devices for monitoring blood sugar, and/or devices for monitoring perspiration level of an occupant. The parameters may be stored in and/or retrieved from the memory 708. The control circuit 702 may transmit digital messages including the parameters and/or data regarding the parameters measured by the sensing devices 718 via the network communication circuit 704.

The network device 700 may comprise a power supply 714 for generating a DC supply voltage Vcc for powering the control circuit 702, the network communication circuit 704, the memory 708, the display 710, the one or more sensing devices 718, and/or other circuitry of the network device 700. The power supply 714 may be a battery or another source of power for the network device 700.

Figure 8:
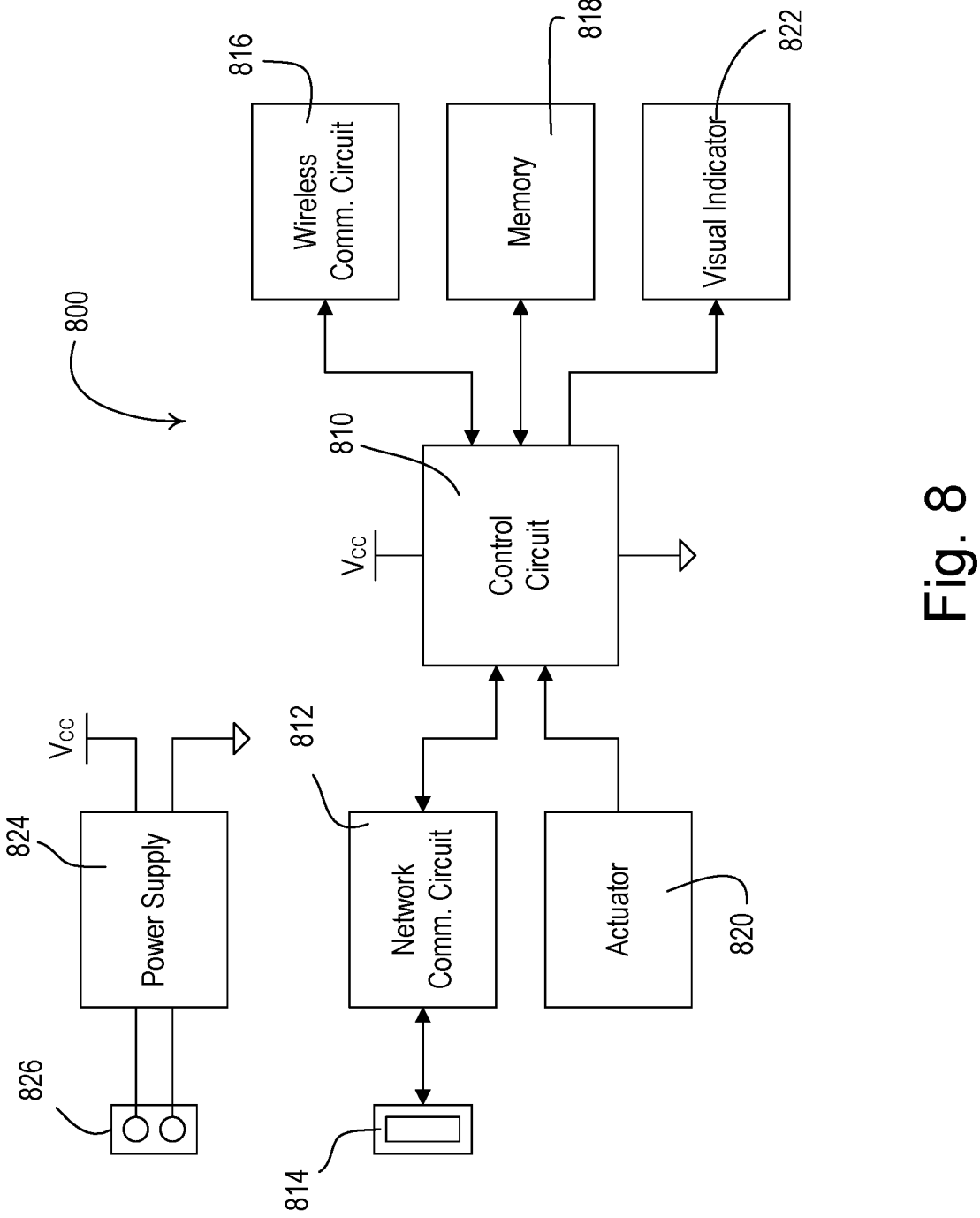
FIG. 8 is a simplified block diagram of an example system controller.

FIG. 8 is a simplified block diagram of an example system controller 800, which may be deployed as, for example, the system controller 110 of the load control system 100 shown in FIG. 1. The system controller 800 may comprise a control circuit 810, which may include one or more of a processor (e.g., a microprocessor), a microcontroller, a programmable logic device (PLD), a field programmable gate array (FPGA), an application specific integrated circuit (ASIC), or any suitable processing device. The control circuit 810 may perform signal coding, data processing, power control, input/output processing, and/or any other functionality that enables the system controller 800 to perform as described herein.

The system controller 800 may comprise a network communication circuit 812 that may be capable of performing wired and/or wireless communications. The network communication circuit may be coupled to a network connector 814 (e.g., an Ethernet jack), which may be adapted to be connected to a wired digital communication link (e.g., an Ethernet communication link) for allowing the control circuit 810 to communicate with network devices on a network. The network communication circuit 812 may be configured to be wirelessly connected to the network, e.g., using Wi-Fi technology or other protocols to transmit and/or receive RF signals.

The system controller 800 may comprise a wireless communication circuit 816, for example, including an RF transceiver coupled to an antenna for transmitting and/or receiving RF signals. The wireless communication circuit 816 may communicate using a proprietary protocol (e.g., the ClearConnect® protocol). The control circuit 810 may be coupled to the wireless communication circuit 816 for transmitting digital messages via the RF signals, for example, to control the load control devices in the load control system 100 in response to digital messages received via the network communication circuit 812. The control circuit 810 may be configured to send/receive digital messages, for example, to/from the load control devices and/or the input devices via the wireless communication circuit 816.

The control circuit 810 may be responsive to an actuator 820 for receiving a user input. For example, the control circuit 810 may be operable to associate the system controller 800 with one or more control devices of the load control system 100 in response to actuations of the actuator 820 during a configuration procedure of the load control system 100. The system controller 800 may comprise additional actuators to which the control circuit 810 may be responsive.

The control circuit 810 may store information in and/or retrieve information from the memory 818. The memory 818 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 810 may access the memory 818 for executable instructions and/or other information that may be used by the system controller 800 to perform as described herein.

The control circuit 810 may illuminate a visual indicator 822 to provide feedback to a user of the load control system 100. For example, the control circuit 810 may blink or strobe the visual indicator 822 to indicate a fault condition. The control circuit 810 may be operable to illuminate the visual indicator 822 different colors to indicator different conditions or states of the system controller 800. The visual indicator 822 may be illuminated by, for example, one or more light-emitting diodes (LEDs). The system controller 800 may comprise more than one visual indicator.

The system controller 800 may comprise a power supply 824 for generating a DC supply voltage Vcc for powering the control circuit 810, the network communication circuit 812, the wireless communication circuit 816, the memory 818, the visual indicator 822, and/or other circuitry of the system controller 800. The power supply 824 may be coupled to a power supply connector 826 (e.g., a USB port) for receiving a supply voltage (e.g., a DC voltage) and/or for drawing current from an external power source.

Figure 9:
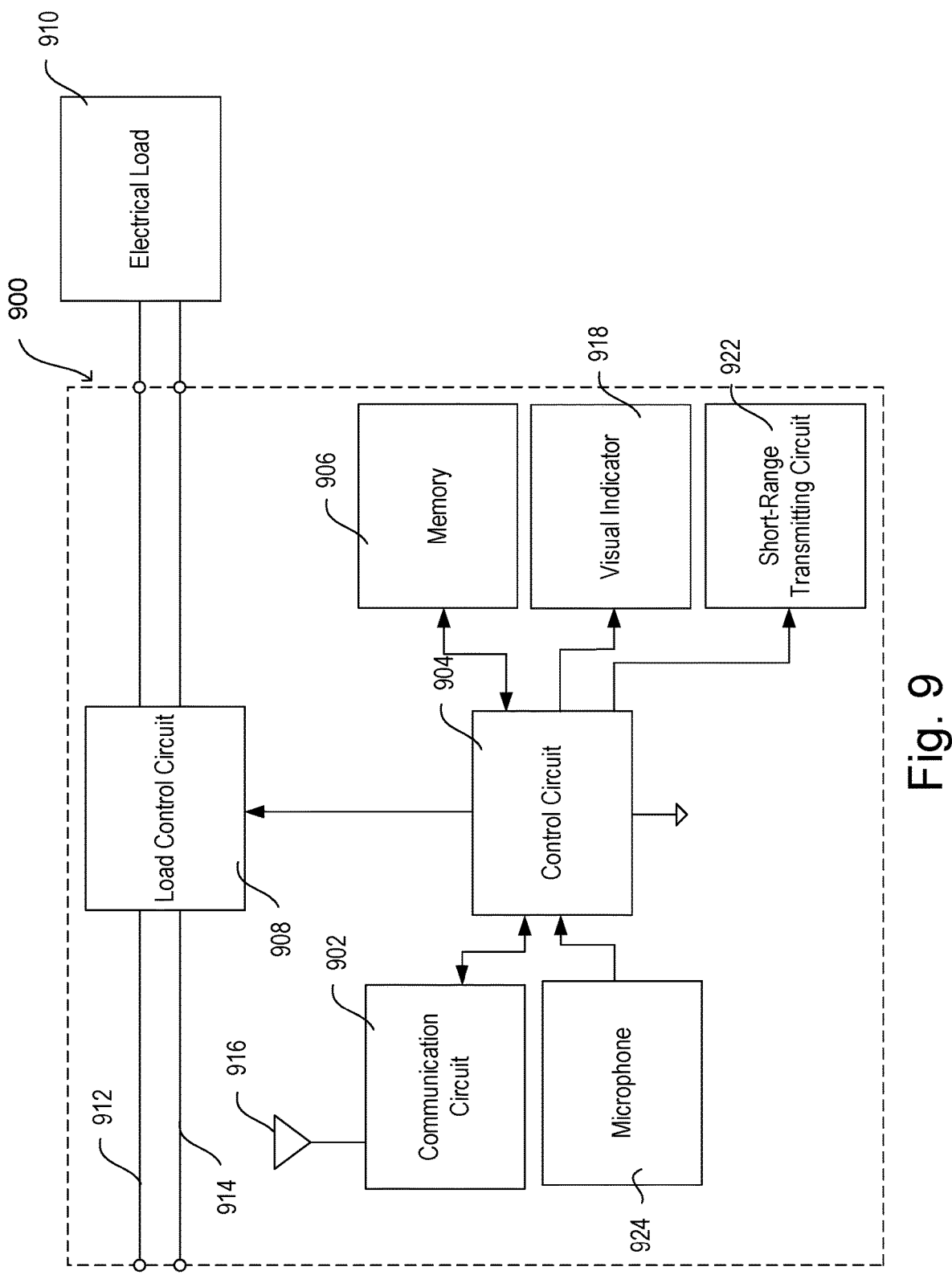
FIG. 9 is a simplified block diagram illustrating an example load control device.

FIG. 9 is a block diagram illustrating an example load control device 900. The load control device 900 may be a control-source device and/or a control-target device for example. The control-source device may be an input device, for example. The load control device 900 may be a dimmer switch, an electronic switch, an electronic ballast for lamps, an LED driver for LED light sources, a plug-in load control device, a temperature control device (e.g., a thermostat), a motor drive unit for a motorized window treatment, or other load control device. The load control device 900 may include a communication circuit 902. The communication circuit 9002 may include a receiver, an RF transceiver or other communication module capable of performing wired and/or wireless communications. The communication circuit 902 may transmit and/or receive digital messages. The digital messages may include a beacon signal, as described herein, and/or the load control device 900 may include a separate short-range communication circuit 922 for transmitting a beacon signal. The control circuit 904 may cause a short-range communication circuit 922 to transmit beacons. The short-range communication circuit 922 may communicate beacons via RF communication signals, for example. The wireless communications may be sent/received via an antenna 916.

The communication circuit 902 may be in communication with a control circuit 904. The control circuit 904 may include one or more general purpose processors, special purpose processors, conventional processors, digital signal processors (DSPs), microprocessors, integrated circuits, a programmable logic device (PLD), application specific integrated circuits (ASICs), or the like. The control circuit 904 may perform signal coding, data processing, power control, input/output processing, or any other functionality that enables the load control device 900 to perform as described herein.

The control circuit 904 may store information in and/or retrieve information from a memory 906. For example, the memory 906 may maintain device identifiers of associated devices and/or instructions that may be executed by the control circuit 904 for performing as described herein. The memory 906 may include a non-removable memory and/or a removable memory. The load control circuit 908 may receive instructions from the control circuit 904 and may control the electrical load 910 based on the received instructions. The load control circuit 908 may receive power via the hot connection 912 and the neutral connection 914 and may provide an amount of power to the electrical load 910. The electrical load 910 may include any type of electrical load. The control-source device may or may not include the load control circuit 908 for controlling an electrical load.

The control circuit 904 may illuminate a visual indicator 918 to provide feedback to a user. For example, the control circuit 904 may blink or strobe the visual indicator 918 to indicate a fault condition. The control circuit 904 may be operable to illuminate the visual indicator 1318 different colors to indicator different conditions or states of the load control device 900. The visual indicator 918 may be illuminated by, for example, one or more light-emitting diodes (LEDs). The load control device 900 may comprise more than one visual indicator. The control circuit 904 may receive audio signals via the microphone 924.

Although features and elements are described above in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. An apparatus, comprising:

control circuitry to:

receive from a mobile device one or more signals via a first wireless network, the one or more signals including:

biometric data associated with a user of the mobile device, the biometric data acquired by one or more sensors carried by the mobile device;

data representative of a personal identifier that uniquely identifies the user of the mobile device;

data representative of respective ones of a plurality of unique identifiers, each of the plurality of unique identifiers associated with a respective one of a corresponding plurality of beacon transmitting devices; and data representative of a signal strength for each of a plurality of beacon signals received at the mobile device, each of the plurality of beacon signals including a respective one of the plurality of unique identifiers;

determine a physical location of the mobile device in a space using the received unique identifier data and the received signal strength data;

receive from an electric load control device in the space a signal indicative of a user input to the electric load control device, the signal received via a second wireless network different than the first wireless network; and responsive to the receipt of both the signal indicative of the user input to the electric load control device in the space and the determination that the mobile device is located in the space:

retrieve, from operatively coupled memory circuitry, one or more personal preference criteria associated with the received personal identifier;

identify a plurality of scenes based on a relationship between:

the determined physical location of the mobile device, the retrieved one or more personal preference criteria associated with the received personal identifier, and the received biometric data, each of the plurality of scenes including an instruction set that includes one or more instructions for each of a plurality of electrical load devices in the space and included in the respective scene;

communicate to the mobile device, via the first wireless network, information representative of each of the plurality of scenes;

receive from the mobile device, via the first wireless network, a user input that includes a scene selection; and communicate, via the second wireless network, the one or more instructions to each of the plurality of electrical load devices included in the selected scene responsive to receipt of the scene selection.

2. The apparatus of claim 1 wherein the first network includes a network having a first network communication protocol and the second network includes a second network having a second network communication protocol that is different from the first network communication protocol.

3. The apparatus of claim 1 wherein the plurality of beacon transmitting devices comprise at least a portion of the one or more electrical load devices included in the selected scene.

4. The apparatus of claim 1, the control circuitry to further:

determine the physical location of the mobile device via triangulation using the received unique identifier data and the received signal strength data.

5. The apparatus of claim 1, the control circuitry to further:

determine, using the received unique identifier data and the received signal strength data, a direction of travel associated with the mobile device.

6. The apparatus of claim 1, the control circuitry to further:

identify one or more scenes proximate the determined direction of travel of the mobile device.

7. A method to control the operation of one or more electrical load devices, the method comprising:

receiving, by a control circuit from a mobile device, one or more signals via a first wireless network using a first network communication protocol, the one or more signals including:

biometric data associated with a user of the mobile device, the biometric data acquired by one or more sensors carried by the mobile device;

data representative of a personal identifier associated with the user of the mobile device;

data representative of respective ones of a plurality of unique identifiers, each of the plurality of unique identifiers associated with a respective one of a corresponding plurality of beacon transmitting devices; and data representative of a signal strength for each of a plurality of beacon signals received at the mobile device, each of the plurality of beacon signals including a respective one of the plurality of unique identifiers;

determining, by the control circuit, a physical location of the mobile device in a space using the received unique identifier data and the received signal strength data;

receiving, by the control circuit from an electric load control device in the space a signal indicative of a user input to the electric load control device, the signal received via a second wireless network different than the first wireless network; and responsive to the receipt of both the signal indicative of the user input to the electric load control device in the space and the determination that the mobile device is located in the space:

retrieving, by the control circuit from operatively coupled memory circuitry, one or more personal preference criteria associated with the received personal identifier;

identifying, by the control circuit, a plurality of scenes based on a relationship between:

the determined physical location of the mobile device, the retrieved one or more personal preference criteria associated with the received personal identifier, and the received biometric data, each of the plurality of scenes including an instruction set that includes one or more instructions for each of one or more electrical load devices included in the respective scene;

communicating, by the control circuit to the mobile device, via the first wireless network, information representative of each of the plurality of scenes;

receiving, by the control circuit from the mobile device, via the first wireless network, a user input that includes a scene selection; and communicating, by the control circuit via the second wireless network, the one or more instructions to each of the plurality of electrical load devices included in the selected scene responsive to receipt of the scene selection.

8. The method of claim 7 wherein communicating, via the second network, the one or more instructions to each of the one or more electrical load devices included in the selected scene responsive to receipt of the scene selection further comprises:

communicating, by the control circuit via a second network having a second network communication protocol that is different from a first network communication protocol.

9. The method of claim 7 wherein receiving the one or more signals from the plurality of beacon transmitting devices further comprises:

receiving, by the control circuit, at least some of the one or more signals from at least a portion of the one or more electrical load devices included in the selected scene.

10. The method of claim 7, further comprising:

determining, by the control circuit, the physical location of the mobile device via triangulation using the received unique identifier data and the received signal strength data.

11. The method of claim 7, further comprising:

determining, by the control circuit using the received unique identifier data and the received signal strength data, a direction of travel associated with the mobile device.

12. The method of claim 7, further comprising:

identifying, by the control circuit, one or more scenes proximate the determined direction of travel of the mobile device.

13. A non-transitory, machine-readable, storage device that includes instructions that, when executed by an electrical load control circuit, cause the control circuit to:

receive, from a mobile device via a communications interface circuit, one or more signals via a first wireless network using a first network communication protocol, the one or more signals including:

biometric data associated with a user of the mobile device, the biometric data acquired by one or more sensors carried by the mobile device;

data representative of a personal identifier associated with the user of the mobile device;

data representative of respective ones of a plurality of unique identifiers, each of the plurality of unique identifiers associated with a respective one of a corresponding plurality of beacon transmitting devices; and data representative of a signal strength for each of a plurality of beacon signals received at the mobile device, each of the plurality of beacon signals including a respective one of the plurality of unique identifiers;

determine a physical location of the mobile device in a space using the received unique identifier data and the received signal strength data;

receive, from the electric load control device in the space a signal indicative of a user input to the electric load control device, the signal received via a second wireless network different than the first wireless network; and responsive to the receipt of both the signal indicative of the user input to the electric load control device in the space and the determination that the mobile device is in the space:

retrieve, from memory circuitry, one or more personal preference criteria associated with the received personal identifier;

identify a plurality of scenes based on a relationship between: the determined physical location of the mobile device, the retrieved one or more personal preference criteria associated with the received personal identifier, and the received biometric data, each of the plurality of scenes including an instruction set that includes one or more instructions for each of a plurality of electrical load devices in the space and included in the respective scene;

communicate, to the mobile device via the communications interface circuit, via the first wireless network, information representative of each of the plurality of scenes;

receive, from the mobile device, via the first wireless network, a user input that includes a scene selection;

communicating, by the control circuit via the second wireless network, the one or more instructions to each of the plurality of electrical load devices included in the selected scene responsive to receipt of the scene selection.

14. The non-transitory, machine-readable, storage device of claim 13 wherein the instructions that cause the control circuit to communicate, via the second network, the one or more instructions to each of the one or more electrical load devices included in the selected scene responsive to receipt of the scene selection further cause the control circuit to:

communicate, via a second network having a second network communication protocol that is different from a first network communication protocol.

15. The non-transitory, machine-readable, storage device of claim 13 wherein the instructions that cause the control circuit to receive the one or more signals from the plurality of beacon transmitting devices further cause the control circuit to:

receive at least some of the one or more signals from at least a portion of the one or more electrical load devices included in the selected scene.

16. The non-transitory, machine-readable, storage device of claim 13 wherein the machine-readable instructions further cause the control circuit to:

determine the physical location of the mobile device via triangulation using the received unique identifier data and the received signal strength data.

17. The non-transitory, machine-readable, storage device of claim 13 wherein the machine-readable instructions further cause the control circuit to:

determine, using the received unique identifier data and the received signal strength data, a direction of travel associated with the mobile device.

18. The non-transitory, machine-readable, storage device of claim 13 wherein the machine-readable instructions further cause the control circuit to:

identify one or more scenes proximate the determined direction of travel of the mobile device.

* * * * *